US012266355B2

(12) United States Patent
Hueser et al.

(10) Patent No.: US 12,266,355 B2
(45) Date of Patent: Apr. 1, 2025

(54) SHARED ENCODER FOR NATURAL LANGUAGE UNDERSTANDING PROCESSING

(71) Applicant: Amazon Technologies, Inc., Seattle, WA (US)

(72) Inventors: Jonathan Jakob Hueser, Aachen (DE); Fabian Triefenbach, Meschede (DE); Chandana Satya Prakash, Revere, MA (US); Jin Cao, Forest Hills, NY (US); Wael Hamza, Yorktown Heights, NY (US); Mariusz Momotko, Tczew (PL)

(73) Assignee: Amazon Technologies, Inc., Seattle, WA (US)

( * ) Notice: Subject to any disclaimer, the term of this patent is extended or adjusted under 35 U.S.C. 154(b) by 455 days.

(21) Appl. No.: 17/690,609

(22) Filed: Mar. 9, 2022

(65) Prior Publication Data

US 2023/0317066 A1 Oct. 5, 2023

(51) Int. Cl.
*G06F 40/30* (2020.01)
*G06F 40/295* (2020.01)
*G10L 15/06* (2013.01)
*G10L 15/18* (2013.01)
*G10L 15/22* (2006.01)
*G06F 40/279* (2020.01)
*G10L 15/08* (2006.01)
*G10L 15/30* (2013.01)

(52) U.S. Cl.
CPC ........ *G10L 15/1815* (2013.01); *G06F 40/295* (2020.01); *G06F 40/30* (2020.01); *G10L 15/063* (2013.01); *G10L 15/22* (2013.01); *G06F 40/279* (2020.01); *G10L 2015/088* (2013.01); *G10L 15/1822* (2013.01); *G10L 2015/223* (2013.01); *G10L 15/30* (2013.01)

(58) Field of Classification Search
None
See application file for complete search history.

(56) References Cited

U.S. PATENT DOCUMENTS

| 10,431,207 | B2 * | 10/2019 | Angkititrakul | ......... G10L 15/16 |
| 10,679,613 | B2 * | 6/2020 | Wabgaonkar | ........... G10L 15/16 |
| 10,762,903 | B1 * | 9/2020 | Kahan | ..................... G10L 15/26 |

(Continued)

OTHER PUBLICATIONS

Liu et al., "Attention-Based Recurrent Neural Network Models for Joint Intent Detection and Slot Filling", arXiv:1609.01454, Sep. 6, 2016. (Year: 2016).*

(Continued)

*Primary Examiner* — Richard Z Zhu
(74) *Attorney, Agent, or Firm* — Pierce Atwood LLP

(57) ABSTRACT

Techniques for using a shared encoder and multiple different decoders for natural language understanding (NLU) tasks are described. The individual decoders are configured to perform different tasks using the output from one shared encoder. The decoders can process with respect to different domains and different languages. Using the shared encoder can reduce computation time during runtime. Using the shared encoder can reduce training costs (e.g., time and resources) when the system is updated to incorporate additional intents and entities. The system employs an attention mechanism to extract encoded representation data that can be used by the different decoders for its specific task.

20 Claims, 12 Drawing Sheets

(56) References Cited

U.S. PATENT DOCUMENTS

| | | | |
|---|---|---|---|
| 10,902,211 | B2* | 1/2021 | Wang .................... G06N 3/08 |
| 11,087,094 | B2* | 8/2021 | Chatterjee .............. G06N 5/022 |
| 11,087,739 | B1* | 8/2021 | Rastrow ................. G10L 15/30 |
| 11,107,462 | B1* | 8/2021 | Fuegen .................. G10L 15/22 |
| 11,114,090 | B1 | 9/2021 | Hertschuh et al. |
| 11,482,212 | B2* | 10/2022 | Kim ..................... G10L 15/1815 |
| 11,948,058 | B2* | 4/2024 | Lipka .................... G06N 3/088 |
| 2021/0391080 | A1* | 12/2021 | Fan ...................... G06F 40/295 |
| 2022/0084508 | A1* | 3/2022 | Kuo ...................... H04L 67/10 |
| 2023/0081306 | A1* | 3/2023 | Kuo ...................... G06N 3/0455 704/200 |

OTHER PUBLICATIONS

International Search Report and Written Opinion mailed on Jul. 13, 2023 and issued for International Application No. PCT/US2023/014446 filed on Mar. 3, 2023, 11 pages.

Abnar, et al. "Exploring the limits of large-scale pre-training", 2021, arXiv preprint arXiv:2110.02095.

Brown, et al., "Language models are few-shot learners", Advances in Neural Information Processing, 2020, 33:1877-1901.

Cer, et al., "Universal sentence encoder for English", Proceeding of the 2018 Conference on Empirical Methods in Natural Language Processing: System Demonstrations, 2018, pp. 169-174.

Chen, et al., "Bert for joint intent classification and slot filing", arXiv:1902.10909.

Conneau, et al., "Cross-lingual language model pretraining", Advances in Neural Information Processing Systems, 2019, p. 32.

Devlin, et al., "BERT: Pre-training of deep bidirectional transformers for language understanding", Proceedings of the 2019 Conference of the North American Chapter of the Association for Computational Linguistics: Human Language Technologies, vol. 1 (Long and Short Papers), 2019, pp. 4171-4186.

Do, et al., "To what degree can language borders be blurred in BERT-based multilingual spoken language understanding?" Proceedings of the 28th International Conferenced on Computational Linguistucs, 2020, p. 2699-2709.

Do, et al., "Cross-lingual transfer learning for spoken language understanding", ICASPP 2019-2019 IEEE International Conference on Acoustics, Speech and Signal Processing (ICASSP), 2019, p. 5956-5960.

FitzGerald, et al., "Alexa teacher model: Pretraining and distilling multi-billion-parameter encoders for natural language understanding systems", Proceedings of the 28th Acm Sigkdd Conference on Knowledge Discovery and Data Mining, 2022, p. 2893-2902.

FitzGerald, et al., "Massive: A 1M-example multilingual natural language understanding dataset with 51 typologically-diverse languages", 2022, arXiv preprint 582 arXiv:2204.08582.

Guo, et al., "Joint semantic utterance classification and slot filling with recursive neural networks", IEEE Spoken Language Technology Workshop (SLT), 2014, p. 554-559.

Hakkani-Tür, et al., "Multi-domain joint semantic frame parsing using bi-directional RNN-LSTM", Interspeech 2016, 17th Annual Conference of the International Speech Communication Association, Sep. 2016, p. 715-719.

Jiao, et al. "TinyBERT: Distilling BERT for natural language understanding", 2019, arXiv preprint arXiv:1909.10351.

Kaplan, et al., "Scaling laws for neural language models", 2020, arXiv preprint arXiv:2001.08361.

Kapoor, et al., "Bootstrapping NLU models with multi-task learning", 2019, arXiv:1911.06673.

Liu, et al., "Multi-task deep neural networks for natural language understanding", Proceedings of the 57th Annual Meeting of the Association for Computational Linguistics, 2019, p. 4487-4496, arXiv:1901.11504.

Liu, et al., "Autofreeze: Automatically freezing model blocks to accelerate fine-tuning", 2021, arXiv preprint arXiv:2102.01386.

Radford, et al., "Language models are unsupervised multitask learners", OpenAI blog, 1(8), 9.

Soltan, et al., "Limitations of knowledge distillation for zero-shot transfer learning", Proceedings of the Second Workshop on Simple and Efficient Natural Language Processing, 2021, p. 22-31.

Vaswani, et al., "Attention is all you need", 31st Conference on Advances in Neural Information Processing Systems, 2017, p. 1-11.

Wang, et al., "MiniLM: Deep self-attention distillation for task-agnostic compression of pre-trained transformers", 34th Conference on Neural Information Processing Systems, 2020, 33:5776-5788.

Xu, et al., "End-to-End slot alignment and recognition for cross-lingual NLU", Proceedings of the 2020 Conference on Empirical Methods in Natural Language Processing (EMNLP), 2020, p. 5052-5063.

Zhang, et al., "Language agnostic and language-aware multilingual natural language understanding for large-scale Intelligent voice assistant application", 2021 IEEE International Conference on Big Data, 2021, p. 1523-1532.

International Preliminary Report on Patentability mailed Sep. 19, 2024, for International Patent Application No. PCT/US2023/014446.

* cited by examiner

_US 12,266,355 B2_

SHARED ENCODER FOR NATURAL LANGUAGE UNDERSTANDING PROCESSING

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
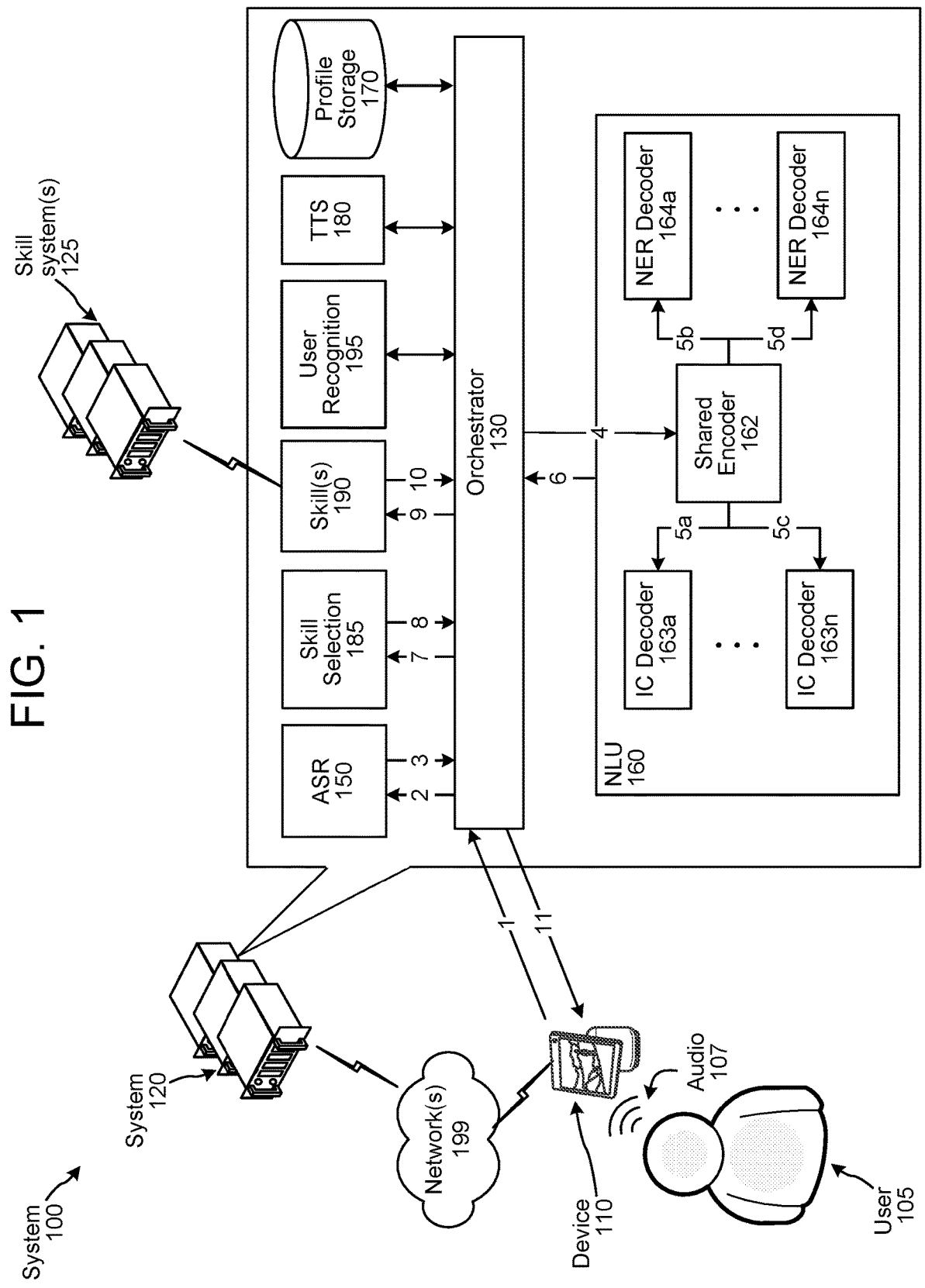
FIG. 1 is a conceptual diagram illustrating a system using a shared encoder for NLU processing, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. Text-to-speech (TTS) is a field of concerning transforming textual data into audio data that is synthesized to resemble human speech. Natural language generation (NLG) can also be used to generate human-understandable outputs representing machine representations of information. The NLG outputs can be shared with human users via TTS, displayed text, or other ways of communicating natural language content to a user.

NLU may involve domain classification, which may determine a domain corresponding to a user input. As used herein, a "domain" may refer to a collection of related functionality. A domain may be associated with one or more skills that perform related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

NLU may further involve intent classification, which may determine an intent corresponding to a user input. One or more intents may be associated with a particular domain. For example, an intent to play music, an intent to create a playlist, etc. may be associated with the music domain. As another example, an intent to purchase an item may be associated with the shopping domain.

NLU may also involve named entity recognition (NER), which may involve identifying an entity (e.g., a place, a person, a thing, a topic, an event, or other objects) included in a user input, and also identifying a type of entity. In some cases, NLU may also involve entity resolution (ER), which relates to determining a real world object/entity that corresponds to the identified entity in the user input. Collectively, ASR and NLU may be referred to as a speech processing system.

Certain speech processing systems may be configured to perform actions responsive to user inputs. For example, for the user input of "Alexa, play music by [artist]," a system may output music sung by the indicated artist. For further example, for the user input of "Alexa, what is the weather for [city]," a system may output synthesized speech representing weather information for a geographic location of the user. In a further example, for the user input of "Alexa, send a message to John," a system may capture spoken message content and cause same to be output via a device registered to "John."

A system can use various machine learning models, such as those configured in an encoder-decoder architecture, to process user inputs. Some example systems use multiple encoder-decoder pairs, where each encoder-decoder pair is configured to perform a different task. For example, a first encoder-decoder pair may be configured to perform intent classification for a first domain, a second encoder-decoder pair may be configured to perform intent classification for a second domain, a third encoder-decoder pair may be configured to perform NER for the first domain, etc.

The present disclosure relates to techniques involving use of a shared encoder with multiple different decoders, where each decoder is configured to perform a different speech processing task. A system of the present disclosure processes input data using the shared encoder to determine encoded representation data, and the encoded representation data is processed by one or more decoders to perform different speech processing tasks. For example, the shared encoder may process ASR data representing a spoken input to determine encoded representation data, and the encoded representation data may be processed using a first decoder configured to perform intent classification for a first domain, a second decoder configured to perform intent classification for a second domain, a third decoder configured to perform NER for the first domain, etc.

Using a shared encoder can reduce resources and time used for NLU processing, for example, by processing using the shared encoder once (for a user input), and processing the output of the shared encoder using multiple decoders to perform different tasks. Additionally, resources and time used for training the system can also be reduced using a shared encoder.

Fine-tuning pre-trained models is one approach for adapting general purpose models to downstream tasks. Such fine-tuning can be parameter inefficient and computation/memory-heavy at both training and runtime, which can hinder deployment of speech processing systems.

To address the challenge of efficiency, the present disclosure may use a task-specific attention-fusion architecture for adapting certain models for particular speech processing tasks. In some embodiments, the attention-fusion architecture extends a general purpose encoder with a task dependent attention-fusion module. With the attention-fusion module, decoders can more effectively utilize the pre-trained networks by selecting hidden representations suitable for the tasks from different layers in the encoder.

The teachings of the present disclosure may provide a more efficient speech processing system by using a shared encoder for different tasks. This is due, at least in part, to the fact that the teachings of the present disclosure reduce use of time and resources with respect to runtime and training operations.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 shows a system 100 using a shared encoder for NLU processing. As shown in FIG. 1, the system 100 may include a device 110, local to a user 105, in communication with a system 120 via one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The user 105 may speak an input, and the device 110 may capture audio 107 representing the spoken input. For example, the user 105 may say "Alexa, what is the weather" or "Alexa, book me a plane ticket to Seattle." In other examples, the user 105 may provide another type of input (e.g., selection of a button, selection of one or more displayed graphical interface elements, performance of a gesture, etc.). The device 110 may send (step 1) input audio data (or other type of input data, such as, image data corresponding to a gesture, text data corresponding to a selected button or a graphical user interface element, etc.) corresponding to the user input to the system 120 for processing. The orchestrator component 130 may receive the input data from the device 110. In the case that the input data is audio data, the orchestrator component 130 may send (step 2) the audio data to the ASR component 150, and the ASR component 150 may process the audio data to determine ASR output data including one or more ASR hypotheses (e.g., token data, natural language text data, etc.) corresponding to the words spoken by the user 105.

The ASR component 150 may process the input audio data to determine ASR output data including one or more ASR hypotheses corresponding to the words included in the spoken user input. An ASR hypothesis may be configured as a textual interpretation of the words, or may be configured in another manner, such as one or more tokens. Each ASR hypothesis may represent a different likely interpretation of the words spoken in the input audio data. Each ASR hypothesis may be associated with a score representing a confidence of ASR processing performed to determine the ASR hypothesis with which the score is associated.

The ASR component 150 interprets the speech in the input audio data based on a similarity between the audio data and pre-established language models. For example, the ASR component 150 may compare the input audio data with models for sounds (e.g., subword units, such as phonemes, etc.) and sequences of sounds to identify words that match the sequence of sounds of the speech represented in the input audio data. The ASR component 150 may send (step 3) the ASR output data to the orchestrator component 130.

The orchestrator component 130 may send (step 4) the ASR output data to a NLU component 160, for example, to a shared encoder 162. In some embodiments, the NLU component 160 may include the shared encoder 162 and multiple decoders, for example, intent classification (IC) decoders 163 and NER decoders 164.

The shared encoder 162 may process the ASR output data (or other type of input data) to determine encoded representation data corresponding to the user input received from the user 105. The NLU component 160 may send (step 5a) the encoded representation data to the IC decoder 163a, send (step 5b) the encoded representation data to the NER decoder 164a, send (step 5c) the encoded representation data to the IC decoder 163n, and send (step 5d) the encoded representation data to the NER decoder 164n. The steps 5a-5d may be performed at least partially in parallel. Details on the shared encoder 162 are described below in relation to FIG. 4.

In some embodiments, the encoded representation data determined by the shared encoder 162 may be cached/stored, and may be available for use by other components of the system 120 when performing processing with respect to the instant spoken input (received in step 1).

The NLU component 160 may be configured to determine, using the IC decoders 163, an intent corresponding to the user input. Each of the IC decoders 163 may correspond to a domain. Multiple IC decoders 163 may correspond to the same domain. For example, IC decoders 163a and 163b may correspond to a first domain (e.g., a shopping domain) and may determine intents (e.g., purchase intent, add to cart intent, add to list intent, etc.) that are associated with the first domain. As another example, IC decoders 163c and 163d may correspond to a second domain (e.g., a music domain)

and may determine intents (e.g., add to playlist intent, play song intent, play music video intent, etc.) that are associated with the second domain, etc.

The NLU component 160 may use the IC decoders 163 to determine an intent corresponding to the user input. An intent corresponds to an action responsive to the user input. To perform IC processing, the NLU component 160/the IC decoders 163 may communicate with a database of words linked to intents. For example, a music intent database may link words and phrases such as "quiet," "volume off," and "mute" to a <Mute> intent. The NLU component 160 identifies intents by comparing words and phrases in the ASR output data to the words and phrases in an intents database. In some embodiments, the NLU component 160 may communicate with multiple intents databases, with each intents database corresponding to one or more intents associated with a particular skill component.

For example, processing, by the IC decoder 163, of encoded representation data corresponding to an example user input "play my workout playlist" may determine an intent of <PlayMusic>. For further example, processing, by the IC decoder 163, of encoded representation data corresponding to an example user input "call mom" may determine an intent of <Call>. In another example, processing, by the IC decoder 163, of encoded representation data corresponding to the user input "call mom using video" may determine an intent of <VideoCall>. In yet another example, processing, by the IC decoder 163, of encoded representation data corresponding to an example user input "what is today's weather" may determine an intent of <OutputWeather>.

The NLU component 160 may also be configured to determine, using the NER decoders 164, one or more entity types and entities corresponding to the user input. Multiple NER decoders 164 may correspond to the same domain. For example, NER decoders 164*a* and 164*b* may correspond to a first domain (e.g., a shopping domain) and may determine entity types and entities (e.g., item name, price, quantity, etc.) that are associated with the first domain. As another example, NER decoders 164*c* and 164*d* may correspond to a second domain (e.g., a music domain) and may determine entity types and entities (e.g., song name, artist name, album name, etc.) that are associated with the second domain, etc.

The NLU component 160 using the NER decoders 164 may also perform NER processing on the ASR output data to determine one or more portions, sometimes referred to as slots, of the user input that may be needed for post-NLU processing, e.g., processing performed by a skill component. For example, processing, by the NER decoder 164, of encoded representation data corresponding to an example user input "play [song name]" may determine an entity type of "SongName" and an entity value corresponding to the indicated song name. For further example, processing, by the NER decoder 164, of encoded representation data corresponding to an example user input "call mom" may determine an entity type of "Recipient" and an entity value corresponding to "mom." In another example, processing, by the NER decoder 164, of encoded representation data corresponding to an example user input "what is today's weather" may determine an entity type of "Date" and an entity value of "today."

In some embodiments, an intent may be linked to one or more entity types to be populated with entity values. For example, a <PlayMusic> intent may be associated with an "artist name" entity type, an "album name" entity type, and/or a "song name" entity type.

For example, the NLU component 160 may perform NER processing (using the NER decoders 164) to identify words in ASR output data as subject, object, verb, preposition, etc. based on grammar rules and/or models. Then, the NLU component 160 may perform IC processing (using the IC decoders 163) using the identified verb to identify an intent. Thereafter, the NLU component 160 may again perform NER processing to determine the entity type(s) associated with the identified intent. For example, a model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

The NER decoders 164 may perform semantic tagging, which is the labeling of a word or combination of words according to their type/semantic meaning. The NER decoders 164 may include parsing ASR output data using heuristic grammar rules, or a model may be constructed using techniques such as hidden Markov models, maximum entropy models, log linear models, conditional random fields (CRFs), and the like. For example, NER processing with respect to a music skill component may include parsing and tagging ASR output data corresponding to "play mother's little helper by the rolling stones" as {Verb}: "Play," {Object}: "mother's little helper," {Object Preposition}: "by," and {Object Modifier}: "the rolling stones." The NER decoder 164 may identify "Play" as a verb based on a word database associated with the music skill component, which the IC decoder 163 determines corresponds to a <PlayMusic> intent.

The NLU component 160 may also perform domain classification (DC) processing to determine a domain corresponding to the user input. As defined herein above, a "domain" may refer to a collection of related functionality. A domain may be associated with one or more skill components performing related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality). In some embodiments, the NLU component 160 may use the encoded representation data, determined by the shared encoder 162, to perform DC processing.

Using the encoded representation data determined by the shared encoder 162, the IC decoders 163 may determine one or more intents corresponding to the user input, and the NER decoders 164 may determine one or more entity types and entities corresponding to the user input. Further details on how the NLU component 160 may process using the IC decoders 163 and the NER decodes 164 are described below in relation to FIGS. 2 and 3. As described below, the NLU component 160 may determine NLU output data including one or more NLU hypotheses, where each NLU hypothesis may include a domain, an intent, one or more entity types and one or more corresponding entities (if appropriate for the user input), and a confidence score for the NLU hypothesis. The NLU component 160 may send (step 6) the NLU output data to the orchestrator component 130, which may send (step 7) the NLU output data to the skill selection component 185.

The skill selection component 185 may process the NLU output data, and optionally other data, to determine one or more skill components 190 that may be capable of performing an action responsive to the user input. The skill selection component 185 is configured to determine a skill component, or n-best list of skill components each associated with a confidence score/value, to execute to respond to the user input. The skill selection component 185 may include a skill component proposal component, a skill component pre-response component, and a skill component ranking component.

The skill component proposal component is configured to determine skill components capable of processing in response to the user input. In addition to receiving the NLU output data, the skill component proposal component may receive context data corresponding to the user input. For example, the context data may indicate a skill component that was causing the device 110 to output content, e.g., music, video, synthesized speech, etc., when the device 110 captured the user input, one or more skill components that are indicated as enabled in a profile (as stored in the profile storage 170) associated with the user 105, output capabilities of the device 110, a geographic location of the device 110, and/or other context data corresponding to the user input.

The skill component proposal component may implement skill component proposal rules. A skill component developer, via a skill component developer device, may provide one or more rules representing when a skill component should be invoked to respond to a user input. In some embodiments, such a rule may be specific to an intent. In such embodiments, if a skill component is configured to execute with respect to multiple intents, the skill component may be associated with more than one rule, e.g., each rule corresponding to a different intent capable of being handled by the skill component. In addition to being specific to an intent, a rule may indicate one or more entity identifiers with respect to which the skill component should be invoked. For further example, a rule may indicate output capabilities of a device, a geographic location, and/or other conditions.

Each skill component may be associated with each rule corresponding to the skill component. As an example, a rule may indicate a video skill component may execute when a user input corresponds to a "PlayVideo" intent and the device includes or is otherwise associated with a display. As another example, a rule may indicate a music skill component may execute when a user input corresponds to a "PlayMusic" intent and music is being output by a device when the device captures the user input. It will be appreciated that other examples are possible. The foregoing rules enable skill components to be differentially proposed at runtime, based on various conditions, in systems where multiple skill components are configured to execute with respect to the same intent.

The skill component proposal component, using the NLU output data, received context data, and the foregoing described skill component proposal rules, determines skill components configured to process in response to the user input. Thus, in some embodiments, the skill component proposal component may be implemented as a rules engine. In some embodiments, the skill component proposal component may make binary, e.g., yes/no, true/false, etc., determinations regarding whether a skill component is configured to process in response to the user input. For example, the skill component proposal component may determine a skill component is configured to process, in response to the user input, if the skill component is associated with a rule corresponding to the intent, represented in the NLU output data, and the context data.

In some embodiments, the skill component proposal component may make such binary determinations with respect to all skill components. In some embodiments, the skill component proposal component may make the binary determinations with respect to only some skill components, e.g., only skill components indicated as enabled in the user profile of the user 105.

After the skill component proposal component is finished processing, the skill component pre-response component may be called to execute. The skill component pre-response component is configured to query skill components, determined by the skill component proposal component as configured to process the user input, as to whether the skill components are in fact able to respond to the user input. The skill component pre-response component may take as input the NLU output data including one or more NLU hypotheses, where each of the one or more NLU hypotheses is associated with a particular skill component determined by the skill component proposal component as being configured to respond to the user input.

The skill component pre-response component sends a pre-response query to each skill component determined by the skill component proposal component. A pre-response query may include the NLU hypothesis associated with the skill component, and optionally other context data corresponding to the user input.

A skill component may determine, based on a received pre-response query and optionally other data available to the skill component, whether the skill component is capable of respond to the user input. For example, a skill component may generate a pre-response indicating the skill component can respond to the user input, indicating the skill component needs more data to determine whether the skill component can respond to the user input, or indicating the skill component cannot respond to the user input.

In situations where a skill component's pre-response indicates the skill component can respond to the user input, or indicating the skill component needs more information, the skill component's pre-response may also include various other data representing a strength of the skill component's potential response to the user input. Such other data may positively influence the skill component's ranking by the skill component ranking component of the skill selection component 185. For example, such other data may indicate capabilities, e.g., output capabilities or components such as a connected screen, loudspeaker, etc., of a device to be used to output the skill component's response; pricing data corresponding to a product or service the user input is requesting be purchased or is requesting information for; availability of a product the user input is requesting be purchased; whether there are shipping fees for a product the user input is requesting be purchased; whether the user 105 already has a profile and/or subscription with the skill component; that the user 105 does not have a subscription with the skill component, but that there is a free trial/tier the skill component is offering; with respect to a taxi skill component, a cost of a trip based on start and end locations, how long the user 105 would have to wait to be picked up, etc.; and/or other data available to the skill component that is related to the skill component's processing of the user input. In some embodiments, a skill component's pre-response may include an indicator, e.g., flag, representing a strength of the skill component's ability to personalize its response to the user input.

In some embodiments, a skill component's pre-response may be configured to a pre-defined schema. By requiring pre-responses to conform to a specific schema, e.g., by requiring skill components to only be able to provide certain types of data in pre-responses, new skill components may be onboarded into the skill component selection functionality without needing to reconfigure the skill selection component 185 each time a new skill component is onboarded. Moreover, requiring pre-responses to conform to a schema limits the amount of values needed to be used to train and implement a ML model for ranking skill components.

After the skill component pre-response component queries the skill components for pre-responses, the skill component ranking component may be called to execute. The skill component ranking component may be configured to select a single skill component, from among the skill components determined by the skill component proposal component, to respond to the user input. In some embodiments, the skill component ranking component may implement a ML model. In some embodiments, the ML model may be a deep neural network (DNN).

The skill component ranking component may take as input the NLU output data, the skill component pre-responses, one or more skill component preferences of the user 105, e.g., as represented in a user profile or group profile stored in the profile storage 170, NLU confidence scores of the NLU output data, a device type of the device 110, data indicating whether the device 110 was outputting content when the user input was received, and/or other context data available to the skill component ranking component.

The skill component ranking component ranks the skill components using the ML model. Things that may increase a skill component's ranking include, for example, that the skill component is associated with a pre-response indicating the skill component can generate a response that is personalized to the user 105, that a NLU hypothesis corresponding to the skill component is associated with a NLU confidence score satisfying a condition, e.g., a threshold NLU confidence score, that the skill component was outputting content via the device 110 when the device 110 received the user input, etc. Things that may decrease a skill component's ranking include, for example, that the skill component is associated with a pre-response indicating the skill component cannot generate a response that is personalized to the user 105, that a NLU hypothesis corresponding to the skill component is associated with a NLU confidence score failing to satisfy a condition, e.g., a threshold NLU confidence score, etc.

The skill component ranking component may generate a score for each skill component determined by the skill component proposal component, where the score represents a strength with which the skill component ranking component recommends the associated skill component be executed to respond to the user input. Such a confidence score may be a numeric score (e.g., between 0 and 1) or a binned score (e.g., low, medium, high).

The skill selection component 185 may send (step 8) a skill component identifier, or a N-best list of skill component identifiers, to the orchestrator component 130. The orchestrator component 130 may send (step 9), to a skill component 190 corresponding to the skill component identifier or best ranked skill component identifier from the n-best list, the NLU output data corresponding to the user input. The skill component 190 may process NLU output data and perform one or more actions in response thereto. For example, for NLU output data including a <PlayMusic> intent, an "artist" entity type, and an artist name as an entity value, a music skill component may output music sung by the indicated artist. For further example, for NLU output data including a <TurnOn> intent, a "device" entity type, and an entity value of "lights," a smart home skill component may cause one or more "smart" lights to operate in an "on" state. In another example, for NLU output data including an <OutputWeather> intent, a "location" entity type, and an entity value corresponding to a geographic location of the device 110, a weather skill component may output weather information for the geographic location. For further example, for NLU output data including a <BookRide> intent, a taxi skill component may book a requested ride. In another example, for NLU output data including a <BuyPizza> intent, a restaurant skill component may place an order for a pizza.

A skill component may operate in conjunction between the device 110/system 120 and other devices, such as a restaurant electronic ordering system, a taxi electronic booking system, etc. in order to complete certain functions. Inputs to a skill component may come from speech processing interactions or through other interactions or input sources.

A skill component may be associated with a domain, a non-limiting list of which includes a smart home domain, a music domain, a video domain, a weather domain, a communications domain, a flash briefing domain, a shopping domain, and a custom domain.

The skill component 190 may process to determine output data responsive to the spoken user input, e.g., based on the intent and entity data as represented in the NLU output data received by the skill component 190. The skill component 190 may send (step 10) the output data to the orchestrator component 130. The orchestrator component 130 may send (step 11) the output data to the device 110 to present to the user 105 in response to the user input (received in step 1). The output data presented to the user 105 may be one or more of audio data (e.g., synthesized speech, music, etc.), video data (e.g., movie, video, etc.), text data, graphics, icons, images, etc.

A skill system(s) 125 may communicate with the skill component(s) 190 within the system 120 directly and/or via the orchestrator component 130. A skill system(s) 125 may be configured to perform one or more actions. A skill may enable a skill system(s) 125 to execute specific functionality in order to provide data or perform some other action requested by a user. For example, a weather service skill may enable a skill service(s) 125 to provide weather information to the system 120, a car service skill may enable a skill system(s) 125 to book a trip using a taxi or ride sharing service, an order pizza skill may enable a skill system(s) 125 to order a pizza using a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system 120 may include a skill component 190 dedicated to interacting with the skill system(s) 125. A skill, skill device, or skill component may include a skill component 190 operated by the system 120 and/or skill operated by the skill system(s) 125.

The TTS component 180 is configured to generate output audio data including synthesized speech. The TTS component 180 may perform speech synthesis using one or more different methods. In one method of synthesis called unit selection, the TTS component 180 matches a database of recorded speech against the data input to the TTS component 180. The TTS component 180 matches the input data against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file, such as its pitch, energy, etc., as well as other information, such as where the phonetic unit appears in a word, sentence, or phrase, the neighboring phonetic units, etc. Using all the information in the unit database, the TTS component 180 may match units to the input data to create a natural sounding waveform. The unit database may include multiple examples of phonetic units to provide the TTS component 180 with many different options for concatenating units into speech. One benefit of unit selection is that, depending on the size of the database, a natural sounding speech output may be generated. The larger the unit database, the more likely the TTS component 180 will be able to construct natural sounding speech.

Unit selection speech synthesis may be performed as follows. Unit selection includes a two-step process. First the TTS component 180 determines what speech units to use and then it combines them so that the particular combined units match the desired phonemes and acoustic features to create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output, e.g., pitch, prosody, etc. A join cost represents how well a speech unit matches a consecutive speech unit for purposes of concatenating the speech units together in the eventual synthesized speech. The overall cost function is a combination of target cost, join cost, and other costs that may be determined by the TTS component 180. As part of unit selection, the unit selection engine chooses the speech unit with the lowest overall combined cost. For example, a speech unit with a very low target cost may not necessarily be selected if its join cost is high.

In another method of synthesis called parametric synthesis, parameters such as frequency, volume, noise, etc. are varied by the TTS component 180 to create an artificial speech waveform output. Parametric synthesis may use an acoustic model and various statistical techniques to match data, input to the TTS component 180, with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS component 180 may include an acoustic model, or other models, which may convert data, input to the TTS component 180, into a synthetic acoustic waveform based on audio signal manipulation. The acoustic model includes rules that may be used to assign specific audio waveform parameters to input phonetic units and/or prosodic annotations. The rules may be used to calculate a score representing a likelihood that a particular audio output parameter(s), such as frequency, volume, etc., corresponds to the portion of the input data.

The TTS component 180 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder, i.e., a digital voice encoder, to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts, such as the phoneme identity, stress, accent, position, etc. An initial determination of a probability of a potential phoneme may be associated with one state. As new text is processed by the TTS component 180, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the TTS component 180 may also calculate potential states for other potential audio outputs, such as various ways of pronouncing phoneme /E/, as potential acoustic matches for the phonetic unit. In this manner multiple states and state transition probabilities may be calculated.

The probable states and probable state transitions calculated by the TTS component 180 may lead to a number of potential audio output sequences. Based on the acoustic model and other potential models, the potential audio output sequences may be scored according to a confidence level of the TTS component 180. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input data.

The system 120 may include a user recognition component 195. The user recognition component 195 may recognize one or more users using various data. The user recognition component 195 may take as input the audio data 911. The user recognition component 195 may perform user recognition by comparing speech characteristics, in the audio data 911, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill system 125, as well as processing performed by other components of the system 120 and/or other systems.

The profile storage 170 may include a variety of data related to individual users, groups of users, devices, etc. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill component enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill component identifiers of skill components that the user has enabled. When a user enables a skill component, the user is providing permission to allow the skill component to execute with respect to the user's inputs. If a user does not enable a skill component, the skill component may be prevented from processing with respect to the user's inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

As described above, speech processing may be performed using two different components, i.e., the ASR component 150 and the NLU component 160. In some embodiments, a spoken language understanding (SLU) component may be configured to process audio data to determine NLU output data. The SLU component may be equivalent to a combination of the ASR component 150 and the NLU component 160. Yet, the SLU component may process audio data and directly determine the NLU output data, without an intermediate step of generating ASR output data. As such, the SLU component may take audio data representing speech and attempt to make a semantic interpretation of the speech. The SLU component may output NLU output data including a most likely NLU hypothesis, or multiple NLU hypotheses associated with respective confidence or other scores (such as probability scores, etc.).

Figure 2:
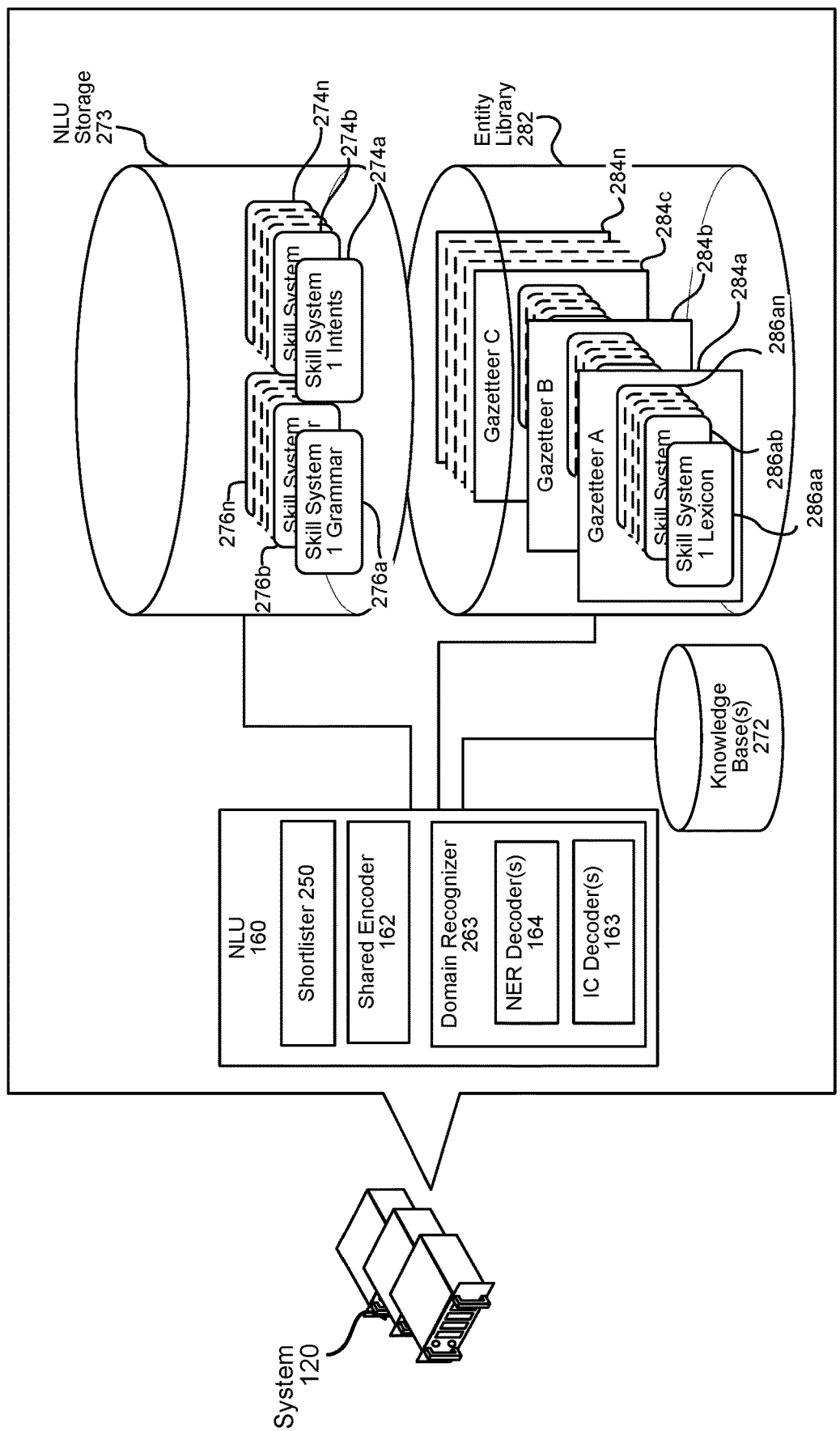
FIG. 2 is a conceptual diagram of how natural language processing may be performed, according to embodiments of the present disclosure.
Figure 3:
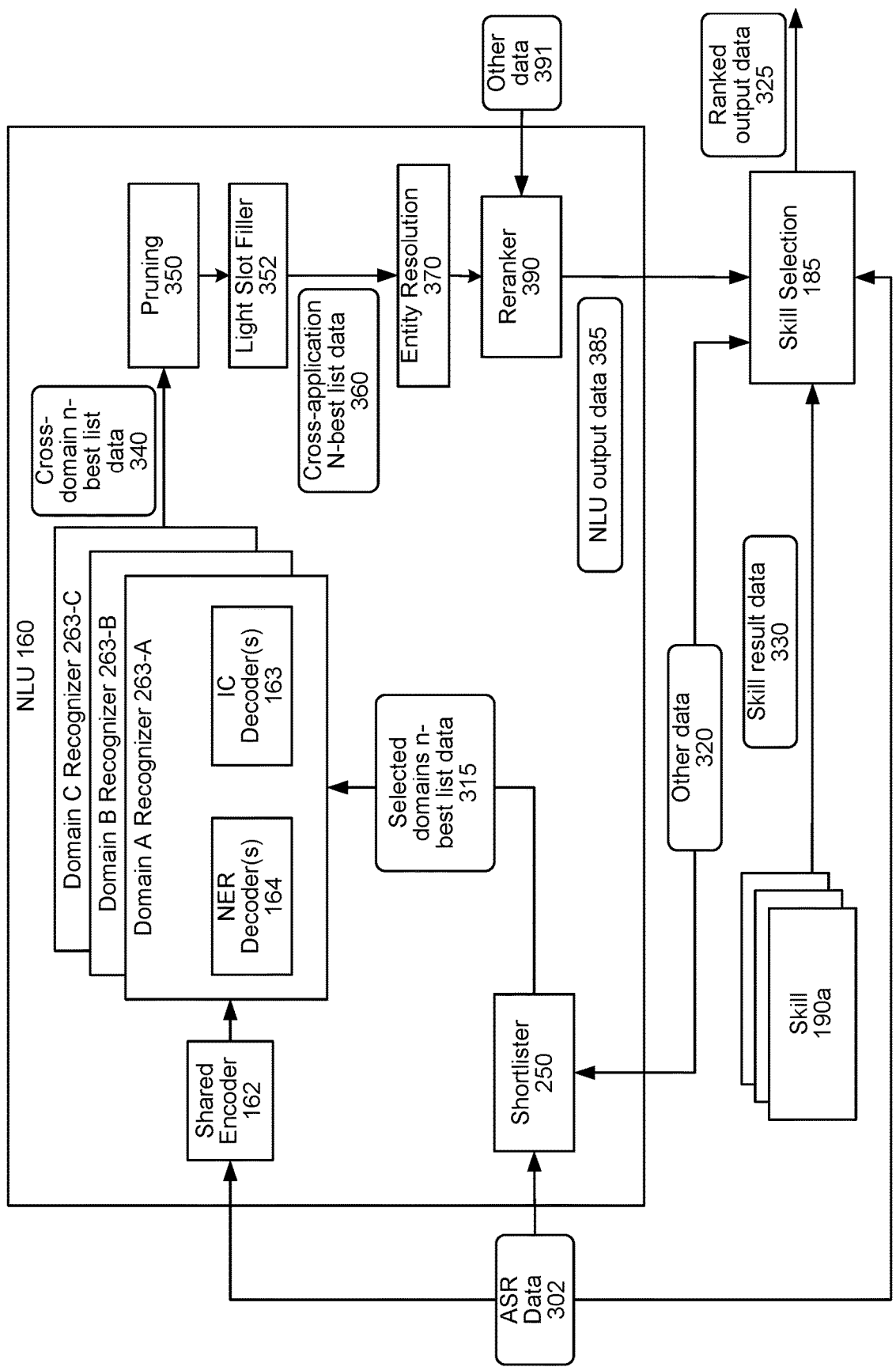
FIG. 3 is a conceptual diagram of how natural language processing is performed, according to embodiments of the present disclosure.

FIGS. 2 and 3 illustrate how the NLU component 160 may perform NLU processing. The NLU component 160 may process text data including several ASR hypotheses of a single user input. For example, if the ASR component 150 outputs text data including an n-best list of ASR hypotheses, the NLU component 160 may process the text data with respect to all (or a portion of) the ASR hypotheses represented therein.

The NLU component 160 may annotate text data by parsing and/or tagging the text data. For example, for the text data "tell me the weather for Seattle," the NLU component 160 may tag "tell me the weather for Seattle" as an <OutputWeather> intent as well as separately tag "Seattle" as a location for the weather information.

The NLU component 160 may include a shortlister component 250. The shortlister component 250 selects skills that may execute with respect to ASR output data 302 input to the NLU component 160 (e.g., applications that may execute with respect to the user input). The ASR output data 302 (which may also be referred to as ASR data 302) may include representations of text of an utterance, such as words, subword units, or the like. The shortlister component 250 thus limits downstream, more resource intensive NLU processes to being performed with respect to skills that may execute with respect to the user input.

Without a shortlister component 250, the NLU component 160 may process ASR output data 302 input thereto with respect to every skill of the system, either in parallel, in series, or using some combination thereof. By implementing a shortlister component 250, the NLU component 160 may process ASR output data 302 with respect to only the skills that may execute with respect to the user input. This reduces total compute power and latency attributed to NLU processing.

The shortlister component 250 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 250 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 250 may be trained with respect to a different skill. Alternatively, the shortlister component 250 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 250. For example, some sample user inputs may be positive examples (e.g., user inputs that may be used to invoke the skill). Other sample user inputs may be negative examples (e.g., user inputs that may not be used to invoke the skill).

As described above, the shortlister component 250 may include a different trained model for each skill of the system, a different trained model for each domain, or some other combination of trained model(s). For example, the shortlister component 250 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 250 to output indications of only a portion of the skills that the ASR output data 302 may relate to. For example, a user input may correspond to "tell me about Tom Collins." If the model is clustered based on domain, the shortlister component 250 may determine the user input corresponds to a recipe skill (e.g., a drink recipe) even though the user input may also correspond to an information skill (e.g., including information about a person named Tom Collins).

The NLU component 160 may include one or more recognizers 263. In at least some embodiments, a recognizer 263 may be associated with a skill system 125 (e.g., the recognizer may be configured to interpret text data to correspond to the skill system 125). In at least some other examples, a recognizer 263 may be associated with a domain such as smart home, video, music, weather, custom, etc. (e.g., the recognizer may be configured to interpret text data to correspond to the domain).

If the shortlister component 250 determines ASR output data 302 is potentially associated with multiple domains, the recognizers 263 associated with the domains may process the ASR output data 302, while recognizers 263 not indicated in the shortlister component 250's output may not process the ASR output data 302. The "shortlisted" recognizers 263 may process the ASR output data 302 in parallel, in series, partially in parallel, etc. For example, if ASR output data 302 potentially relates to both a communications domain and a music domain, a recognizer associated with the communications domain may process the ASR output data 302 in parallel, or partially in parallel, with a recognizer associated with the music domain processing the ASR output data 302.

Each recognizer 263 may include a named entity recognition (NER) decoder 163. The NER decoder 164 attempts to identify grammars and lexical information that may be used to construe meaning with respect to text data input therein. The NER decoder 164 identifies portions of text data that correspond to a named entity associated with a domain, associated with the recognizer 263 implementing the NER decoder 164. The NER decoder 164 (or other component of the NLU component 160) may also determine whether a word refers to an entity whose identity is not explicitly mentioned in the text data, for example "him," "her," "it" or other anaphora, exophora, or the like.

Each recognizer 263, and more specifically each NER decoder 164, may be associated with a particular grammar database 276, a particular set of intents/actions 274, and a particular personalized lexicon 286. The grammar databases 276, and intents/actions 274 may be stored in an NLU storage 273. Each gazetteer 284 may include domain/skill-indexed lexical information associated with a particular user and/or device 110. For example, a Gazetteer A (284a) includes skill-indexed lexical information 286aa to 286an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER decoder 164 applies grammar information 276 and lexical information 286 associated with a domain (associated with the recognizer 263 implementing the NER decoder 164) to determine a mention of one or more entities in text data. In this manner, the NER decoder 164 identifies "slots" (each corresponding to one or more particular words in text data) that may be useful for later processing. The NER decoder 164 may also label each slot with a type (e.g., noun, place, city, artist name, song name, etc.).

Each grammar database 276 includes the names of entities (i.e., nouns) commonly found in speech about the particular domain to which the grammar database 276 relates, whereas the lexical information 286 is personalized to the user and/or the device 110 from which the user input originated. For example, a grammar database 276 associated with a shopping domain may include a database of words commonly used when people discuss shopping.

A downstream process called entity resolution (discussed in detail elsewhere herein) links a slot of text data to a specific entity known to the system. To perform entity resolution, the NLU component 160 may utilize gazetteer information (284a-284n) stored in an entity library storage 282. The gazetteer information 284 may be used to match text data (representing a portion of the user input) with text data representing known entities, such as song titles, contact names, etc. Gazetteers 284 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 263 may also include an intent classification (IC) decoder 163. An IC decoder 163 parses text data to determine an intent(s) (associated with the domain associated with the recognizer 263 implementing the IC decoder 163) that potentially represents the user input. An intent represents to an action a user desires be performed. An IC decoder 163 may communicate with a database 274 of words linked to intents. For example, a music intent database may link words and phrases such as "quiet," "volume off," and "mute" to a <Mute> intent. An IC decoder 163 identifies potential intents by comparing words and phrases in text data (representing at least a portion of the user input) to the words and phrases in an intents database 274 (associated with the domain that is associated with the recognizer 263 implementing the IC decoder 163).

The intents identifiable by a specific IC decoder 163 are linked to domain-specific (i.e., the domain associated with the recognizer 263 implementing the IC decoder 163) grammar frameworks 276 with "slots" to be filled. Each slot of a grammar framework 276 corresponds to a portion of text data that the system believes corresponds to an entity. For example, a grammar framework 276 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 276 may not be structured as sentences, but rather based on associating slots with grammatical tags.

For example, an NER decoder 164 may parse text data to identify words as subject, object, verb, preposition, etc. based on grammar rules and/or models prior to recognizing named entities in the text data. An IC decoder 163 (implemented by the same recognizer 263 as the NER decoder 164) may use the identified verb to identify an intent. The NER decoder 164 may then determine a grammar model 276 associated with the identified intent. For example, a grammar model 276 for an intent corresponding to <PlayMusic> may specify a list of slots applicable to play the identified "object" and any object modifier (e.g., a prepositional phrase), such as {Artist Name}, {Album Name}, {Song name}, etc. The NER decoder 164 may then search corresponding fields in a lexicon 286 (associated with the domain associated with the recognizer 263 implementing the NER decoder 164), attempting to match words and phrases in text data the NER decoder 164 previously tagged as a grammatical object or object modifier with those identified in the lexicon 286.

An NER decoder 164 may perform semantic tagging, which is the labeling of a word or combination of words according to their type/semantic meaning. An NER decoder 164 may parse text data using heuristic grammar rules, or a model may be constructed using techniques such as Hidden Markov Models, maximum entropy models, log linear models, conditional random fields (CRF), and the like. For example, an NER decoder 164 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER decoder 164 identifies "Play" as a verb based on a word database associated with the music domain, which an IC decoder 163 (also implemented by the music domain recognizer) may determine corresponds to a <PlayMusic> intent. At this stage, no determination has been made as to the meaning of "mother's little helper" or "the rolling stones," but based on grammar rules and models, the NER decoder 164 has determined the text of these phrases relates to the grammatical object (i.e., entity) of the user input represented in the text data.

An NER decoder 164 may tag text data to attribute meaning thereto. For example, an NER decoder 164 may tag "play mother's little helper by the rolling stones" as: {domain} Music, {intent} <PlayMusic>, {artist name} rolling stones, {media type} SONG, and {song title} mother's little helper. For further example, the NER decoder 164 may tag "play songs by the rolling stones" as: {domain} Music, {intent} <PlayMusic>, {artist name} rolling stones, and {media type}SONG.

The shortlister component 250 may receive ASR output data 302 output from the ASR component 150 or output from the device 110b (as illustrated in FIG. 3). The ASR component 150 may embed the ASR output data 302 into a form processable by a trained model(s) using sentence embedding techniques as known in the art. Sentence embedding results in the ASR output data 302 including text in a structure that enables the trained models of the shortlister component 250 to operate on the ASR output data 302. For example, an embedding of the ASR output data 302 may be a vector representation of the ASR output data 302.

The shortlister component 250 may make binary determinations (e.g., yes or no) regarding which domains relate to the ASR output data 302. The shortlister component 250 may make such determinations using the one or more trained models described herein above. If the shortlister component 250 implements a single trained model for each domain, the shortlister component 250 may simply run the models that are associated with enabled domains as indicated in a user profile associated with the device 110 and/or user that originated the user input.

The shortlister component 250 may generate n-best list data 315 representing domains that may execute with respect to the user input represented in the ASR output data 302. The size of the n-best list represented in the n-best list data 315 is configurable. In an example, the n-best list data 315 may indicate every domain of the system as well as contain an indication, for each domain, regarding whether the domain is likely capable to execute the user input represented in the ASR output data 302. In another example, instead of indicating every domain of the system, the n-best list data 315 may only indicate the domains that are likely to be able to execute the user input represented in the ASR output data 302. In yet another example, the shortlister component 250 may implement thresholding such that the n-best list data 315 may indicate no more than a maximum number of domains that may execute the user input represented in the ASR output data 302. In an example, the threshold number of domains that may be represented in the n-best list data 315 is ten. In another example, the domains included in the n-best list data 315 may be limited by a threshold a score, where only domains indicating a likelihood to handle the user input is above a certain score (as determined by processing the ASR output data 302 by the shortlister component 250 relative to such domains) are included in the n-best list data 315.

The ASR output data 302 may correspond to more than one ASR hypothesis. When this occurs, the shortlister component 250 may output a different n-best list (represented in the n-best list data 315) for each ASR hypothesis. Alternatively, the shortlister component 250 may output a single n-best list representing the domains that are related to the multiple ASR hypotheses represented in the ASR output data 302.

As indicated above, the shortlister component 250 may implement thresholding such that an n-best list output therefrom may include no more than a threshold number of entries. If the ASR output data 302 includes more than one ASR hypothesis, the n-best list output by the shortlister component 250 may include no more than a threshold number of entries irrespective of the number of ASR hypotheses output by the ASR component 150. Alternatively or in addition, the n-best list output by the shortlister component 250 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 302, the shortlister component 250 may generate confidence scores representing likelihoods that domains relate to the ASR output data 302. If the shortlister component 250 implements a different trained model for each domain, the shortlister component 250 may generate a different confidence score for each individual domain trained model that is run. If the shortlister component 250 runs the models of every domain when ASR output data 302 is received, the shortlister component 250 may generate a different confidence score for each domain of the system. If the shortlister component 250 runs the models of only the domains that are associated with skills indicated as enabled in a user profile associated with the device 110 and/or user that originated the user input, the shortlister component 250 may only generate a different confidence score for each domain associated with at least one enabled skill. If the shortlister component 250 implements a single trained model with domain specifically trained portions, the shortlister component 250 may generate a different confidence score for each domain who's specifically trained portion is run. The shortlister component 250 may perform matrix vector modification to obtain confidence scores for all domains of the system in a single instance of processing of the ASR output data 302.

N-best list data 315 including confidence scores that may be output by the shortlister component 250 may be represented as, for example:

Search domain, 0.67
Recipe domain, 0.62
Information domain, 0.57
Shopping domain, 0.42

As indicated, the confidence scores output by the shortlister component 250 may be numeric values. The confidence scores output by the shortlister component 250 may alternatively be binned values (e.g., high, medium, low).

The n-best list may only include entries for domains having a confidence score satisfying (e.g., equaling or exceeding) a minimum threshold confidence score. Alternatively, the shortlister component 250 may include entries for all domains associated with user enabled skills, even if one or more of the domains are associated with confidence scores that do not satisfy the minimum threshold confidence score.

The shortlister component 250 may consider other data 320 when determining which domains may relate to the user input represented in the ASR output data 302 as well as respective confidence scores. The other data 320 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 320 may include an indicator of the user associated with the ASR output data 302, for example as determined by the user recognition component 195.

The other data 320 may be character embedded prior to being input to the shortlister component 250. The other data 320 may alternatively be embedded using other techniques known in the art prior to being input to the shortlister component 250.

The other data 320 may also include data indicating the domains associated with skills that are enabled with respect to the device 110 and/or user that originated the user input. The shortlister component 250 may use such data to determine which domain-specific trained models to run. That is, the shortlister component 250 may determine to only run the trained models associated with domains that are associated with user-enabled skills. The shortlister component 250 may alternatively use such data to alter confidence scores of domains.

As an example, considering two domains, a first domain associated with at least one enabled skill and a second domain not associated with any user-enabled skills of the user that originated the user input, the shortlister component 250 may run a first model specific to the first domain as well as a second model specific to the second domain. Alternatively, the shortlister component 250 may run a model configured to determine a score for each of the first and second domains. The shortlister component 250 may determine a same confidence score for each of the first and second domains in the first instance. The shortlister component 250 may then alter those confidence scores based on which domains is associated with at least one skill enabled by the present user. For example, the shortlister component 250 may increase the confidence score associated with the domain associated with at least one enabled skill while leaving the confidence score associated with the other domain the same. Alternatively, the shortlister component 250 may leave the confidence score associated with the domain associated with at least one enabled skill the same while decreasing the confidence score associated with the other domain. Moreover, the shortlister component 250 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 170. When the shortlister component 250 receives the ASR output data 302, the shortlister component 250 may determine whether profile data associated with the user and/or device 110 that originated the command includes an indication of enabled skills.

The other data 320 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 250 may use such data to determine which domain-specific trained models to run. For example, if the device 110 corresponds to a displayless type device, the shortlister component 250 may determine not to run trained models specific to domains that output video data. The shortlister component 250 may alternatively use such data to alter confidence scores of domains.

As an example, considering two domains, one that outputs audio data and another that outputs video data, the shortlister component 250 may run a first model specific to the domain that generates audio data as well as a second model specific to the domain that generates video data. Alternatively the shortlister component 250 may run a model configured to determine a score for each domain. The shortlister component 250 may determine a same confidence score for each of the domains in the first instance. The shortlister component 250 may then alter the original confidence scores based on the type of the device 110 that originated the user input corresponding to the ASR output data 302. For example, if the device 110 is a displayless device, the shortlister component 250 may increase the confidence score associated with the domain that generates audio data while leaving the confidence score associated with the domain that generates video data the same. Alternatively, if the device 110 is a displayless device, the shortlister component 250 may leave the confidence score associated with the domain that generates audio data the same while decreasing the confidence score associated with the domain that generates video data. Moreover, if the device 110 is a displayless device, the shortlister component 250 may increase the confidence score associated with the domain that generates audio data as well as decrease the confidence score associated with the domain that generates video data.

The type of device information represented in the other data 320 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 320 may represent the smart TV of other display device, and not the displayless device that captured the spoken user input.

The other data 320 may also include data indicating the user input originating device's speed, location, or other mobility information. For example, the device may correspond to a vehicle including a display. If the vehicle is moving, the shortlister component 250 may decrease the confidence score associated with a domain that generates video data as it may be undesirable to output video content to a user while the user is driving. The device may output data to the system(s) 120 indicating when the device is moving.

The other data 320 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 250 may use such data to alter confidence scores of domains. For example, the shortlister component 250 may run a first model specific to a first domain as well as a second model specific to a second domain. Alternatively, the shortlister component 250 may run a model configured to determine a score for each domain. The shortlister component 250 may also determine a same confidence score for each of the domains in the first instance. The shortlister component 250 may then alter the original confidence scores based on the first domain being invoked to cause the system to output content while the current user input was received. Based on the first domain being invoked, the shortlister component 250 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 315 generated by the shortlister component 250 as well as the different types of other data 320 considered by the shortlister component 250 are configurable. For example, the shortlister component 250 may update confidence scores as more other data 320 is considered. For further example, the n-best list data 315 may exclude relevant domains if thresholding is implemented. Thus, for example, the shortlister component 250 may include an indication of a domain in the n-best list 315 unless the shortlister component 250 is one hundred percent confident that the domain may not execute the user input represented in the ASR output data 302 (e.g., the shortlister component 250 determines a confidence score of zero for the domain).

The shortlister component 250 may send the ASR output data 302 to recognizers 263 associated with domains represented in the n-best list data 315. Alternatively, the shortlister component 250 may send the n-best list data 315 or some other indicator of the selected subset of domains to another component (such as the orchestrator component 130) which may in turn send the ASR output data 302 to the recognizers 263 corresponding to the domains included in the n-best list data 315 or otherwise indicated in the indicator. If the shortlister component 250 generates an n-best list representing domains without any associated confidence scores, the shortlister component 250/orchestrator component 130 may send the ASR output data 302 to recognizers 263 associated with domains that the shortlister component 250 determines may execute the user input. If the shortlister component 250 generates an n-best list representing domains with associated confidence scores, the shortlister component 250/orchestrator component 130 may send the ASR output data 302 to recognizers 263 associated with domains associated with confidence scores satisfying (e.g., meeting or exceeding) a threshold minimum confidence score.

A recognizer 263 may output tagged text data generated by an NER decoder 164 and an IC decoder 163, as described herein above. The NLU component 160 may compile the output tagged text data of the recognizers 263 into a single cross-domain n-best list 340 and may send the cross-domain n-best list 340 to a pruning component 350. Each entry of tagged text (e.g., each NLU hypothesis) represented in the cross-domain n-best list data 340 may be associated with a respective score indicating a likelihood that the NLU hypothesis corresponds to the domain associated with the recognizer 263 from which the NLU hypothesis was output. For example, the cross-domain n-best list data 340 may be represented as (with each line corresponding to a different NLU hypothesis):

[0.95] Intent: <PlayMusic> ArtistName: Beethoven SongName: Waldstein Sonata
[0.70] Intent: <PlayVideo> ArtistName: Beethoven VideoName: Waldstein Sonata
[0.01] Intent: <PlayMusic> ArtistName: Beethoven AlbumName: Waldstein Sonata
[0.01] Intent: <PlayMusic> SongName: Waldstein Sonata The pruning component 350 may sort the NLU hypotheses represented in the cross-domain n-best list data 340 according to their respective scores. The pruning component 350 may perform score thresholding with respect to the cross-domain NLU hypotheses. For example, the pruning component 350 may select NLU hypotheses associated with scores satisfying (e.g., meeting and/or exceeding) a threshold score. The pruning component 350 may also or alternatively perform number of NLU hypothesis thresholding. For example, the pruning component 350 may select the top scoring NLU hypothesis(es). The pruning component 350 may output a portion of the NLU hypotheses input thereto. The purpose of the pruning component 350 is to create a reduced list of NLU hypotheses so that downstream, more resource intensive, processes may only operate on the NLU hypotheses that most likely represent the user's intent.

The NLU component 160 may include a light slot filler component 352. The light slot filler component 352 can take text from slots represented in the NLU hypotheses output by the pruning component 350 and alter them to make the text more easily processed by downstream components. The light slot filler component 352 may perform low latency operations that do not involve heavy operations such as reference to a knowledge base (e.g., 272. The purpose of the light slot filler component 352 is to replace words with other words or values that may be more easily understood by downstream components. For example, if a NLU hypothesis includes the word "tomorrow," the light slot filler component 352 may replace the word "tomorrow" with an actual date for purposes of downstream processing. Similarly, the light slot filler component 352 may replace the word "CD" with "album" or the words "compact disc." The replaced words are then included in the cross-domain n-best list data 360.

The cross-domain n-best list data 360 may be input to an entity resolution component 370. The entity resolution component 370 can apply rules or other instructions to standardize labels or tokens from previous stages into an intent/slot representation. The precise transformation may depend on the domain. For example, for a travel domain, the entity resolution component 370 may transform text corresponding to "Boston airport" to the standard BOS three-letter code referring to the airport. The entity resolution component 370 can refer to a knowledge base (e.g., 272) that is used to specifically identify the precise entity referred to in each slot of each NLU hypothesis represented in the cross-domain n-best list data 360. Specific intent/slot combinations may also be tied to a particular source, which may then be used to resolve the text. In the example "play songs by the stones," the entity resolution component 370 may reference a personal music catalog, Amazon Music account, a user profile, or the like. The entity resolution component 370 may output an altered n-best list that is based on the cross-domain n-best list 360 but that includes more detailed information (e.g., entity IDs) about the specific entities mentioned in the slots and/or more detailed slot data that can eventually be used by a skill. The NLU component 160 may include multiple entity resolution components 370 and each entity resolution component 370 may be specific to one or more domains.

The NLU component 160 may include a reranker 390. The reranker 390 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 370.

The reranker 390 may apply re-scoring, biasing, or other techniques. The reranker 390 may consider not only the data output by the entity resolution component 370, but may also consider other data 391. The other data 391 may include a variety of information. For example, the other data 391 may include skill rating or popularity data. For example, if one skill has a high rating, the reranker 390 may increase the score of a NLU hypothesis that may be processed by the skill. The other data 391 may also include information about skills that have been enabled by the user that originated the user input. For example, the reranker 390 may assign higher scores to NLU hypothesis that may be processed by enabled skills than NLU hypothesis that may be processed by non-enabled skills. The other data 391 may also include data indicating user usage history, such as if the user that originated the user input regularly uses a particular skill or does so at particular times of day. The other data 391 may additionally include data indicating date, time, location, weather, type of device 110, user identifier, context, as well as other information. For example, the reranker 390 may consider when any particular skill is currently active (e.g., music being played, a game being played, etc.).

As illustrated and described, the entity resolution component 370 is implemented prior to the reranker 390. The entity resolution component 370 may alternatively be implemented after the reranker 390. Implementing the entity resolution component 370 after the reranker 390 limits the NLU hypotheses processed by the entity resolution component 370 to only those hypotheses that successfully pass through the reranker 390.

The reranker 390 may be a global reranker (e.g., one that is not specific to any particular domain). Alternatively, the NLU component 160 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 160 may perform NLU processing described above with respect to domains associated with skills wholly implemented as part of the system(s) 120 (e.g., designated 190 in FIG. 1). The NLU component 160 may separately perform NLU processing described above with respect to domains associated with skills that are at least partially implemented as part of the skill system(s) 125. In an example, the shortlister component 250 may only process with respect to these latter domains. Results of these two NLU processing paths may be merged into NLU output data 385, which may be sent to the skill selection component 185, which may be implemented by the system(s) 120.

The skill selection component 185 may include a statistical component that produces a ranked list of intent/skill pairs with associated confidence scores. Each confidence score may indicate an adequacy of the skill's execution of the intent with respect to NLU results data associated with the skill. The skill selection component 185 may operate one or more trained models configured to process the NLU results data 385, skill result data 330, and the other data 320 in order to output ranked output data 325. The ranked output data 325 may include an n-best list where the NLU hypotheses in the NLU results data 385 are reordered such that the n-best list in the ranked output data 325 represents a prioritized list of skills to respond to a user input as determined by the skill selection component 185. The ranked output data 325 may also include (either as part of an n-best list or otherwise) individual respective scores corresponding to skills where each score indicates a probability that the skill (and/or its respective result data) corresponds to the user input.

The system may be configured with various different skills. The skill selection component 185 enables the system to better determine the best skill to execute the user input. For example, first and second NLU hypotheses in the NLU results data 385 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The skill selection component 185 (or another component such as orchestrator component 130) may solicit the first skill and the second skill to provide potential result data 330 based on the first NLU hypothesis and the second NLU hypothesis, respectively. For example, the skill selection component 185 may send the first NLU hypothesis to the first skill 190a along with a request for the first skill 190a to at least partially execute with respect to the first NLU hypothesis. The skill selection component 185 may also send the second NLU hypothesis to the second skill 190b along with a request for the second skill 190b to at least partially execute with respect to the second NLU hypothesis. The skill selection component 185 receives, from the first skill 190a, first result data 330a generated from the first skill 190a's execution with respect to the first NLU hypothesis. The skill selection component 185 also receives, from the second skill 190b, second results data 330b generated from the second skill 190b's execution with respect to the second NLU hypothesis.

The result data 330 may include various portions. For example, the result data 330 may include content (e.g., audio data, text data, and/or video data) to be output to a user. The result data 330 may also include a unique identifier used by the system(s) 120 and/or the skill system(s) 125 to locate the data to be output to a user. The result data 330 may also include an instruction. For example, if the user input corresponds to "turn on the light," the result data 330 may include an instruction causing the system to turn on a light associated with a profile of the device (110a/110b) and/or user.

Figure 4:
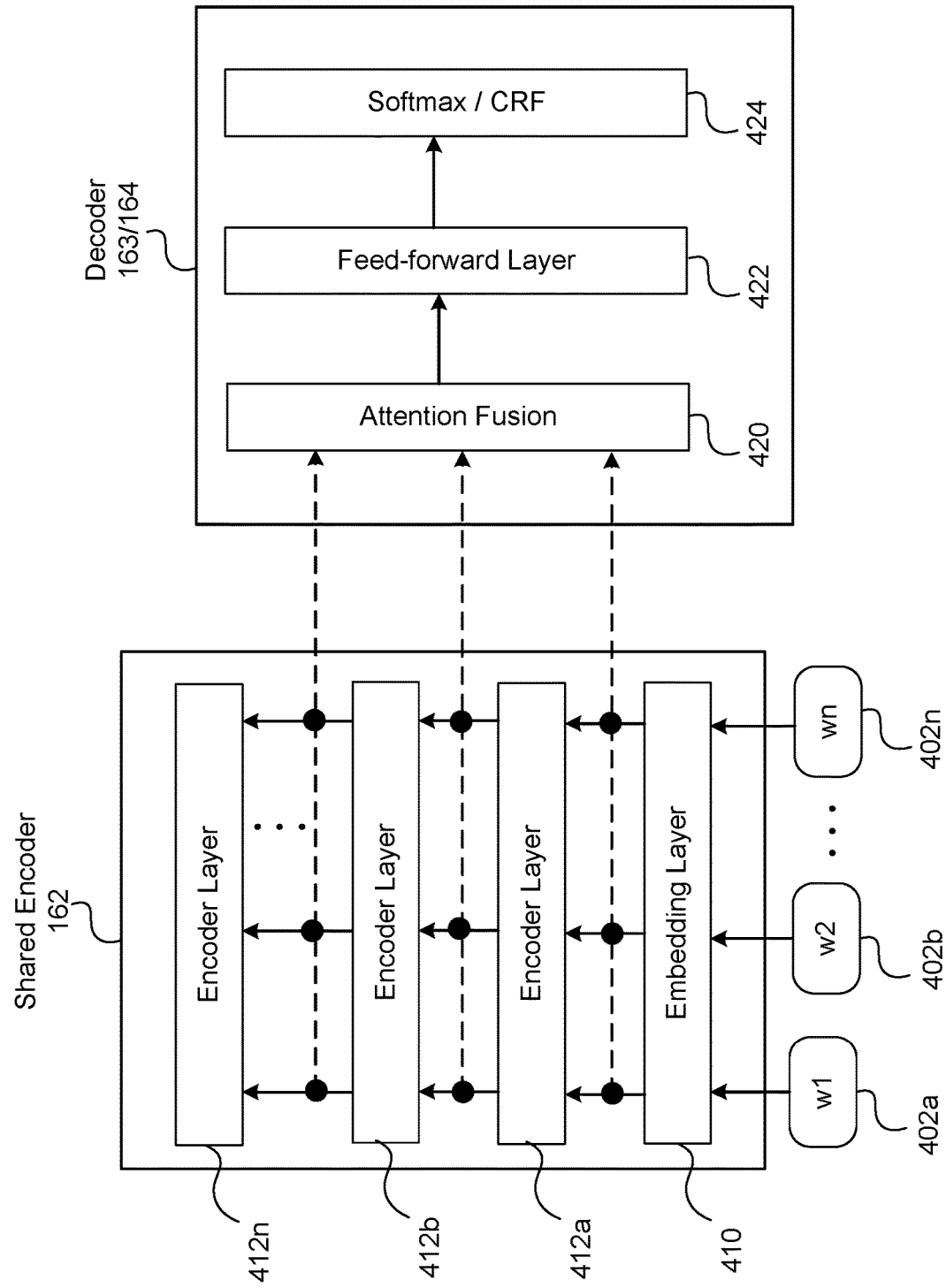
FIG. 4 is a conceptual diagram illustrating components of a shared encoder and a decoder, according to embodiments of the present disclosure.

FIG. 4 is a conceptual diagram illustrating components of the shared encoder 162 and the decoder 164/163. In some embodiments, a task specific attention-fusion architecture may be employed, which adapts to downstream tasks. An attention fusion component 420 may be included in each decoder 163/164 and may be configured according to the decoder's task (e.g., IC processing, NER processing, DC processing, etc.). The attention fusion component 420 may compute task-tuned representations by aggregating different layer representations of the shared encoder 162. The attention fusion component 420 can leverage intermediate hidden representations in the shared encoder 162 by capturing different granularity of information for different tasks, with said information transferring effectively to various domains and languages for further re-use.

The attention fusion component 420 may enable efficient training and fine-tuning of pre-trained models/encoders (e.g., language models, BERT models, etc.) for specific tasks. For example, using the attention fusion component 420 described herein, 0.2% of the total parameters of the pre-trained model may be fine-tuned or trained for a specific task.

The attention-fusion architecture can achieve comparable performance to other fine-tuning approaches while utilizing parameters efficiently. In some embodiments, the attention fusion architecture adapts only this task-specific add-on module to downstream tasks without fine-tuning the entire model. Thus, with minimal loss of accuracy, computation and parameter-efficiency of speech processing systems can be significantly improved by using the shared encoder 162 and reusing the encoded representation data for downstream tasks. Furthermore, the attention-fusion component 420 is transferable across domains and languages.

The attention-fusion architecture utilizes more effectively hidden representations with different granularity from the shared encoder 162. The attention fusion architecture is different from other approaches in that the attention-fusion module is task-dependent and an extension is built on top of the shared encoder 162 (unlike other modules, which insert a bottleneck module inside each layer of a pre-trained model). The resulting light-weight module can further improve performance and parameter usage efficiency.

The attention fusion component 420 adapts hidden representations from a shareable, general-purpose pre-trained model, such as BERT, for downstream tasks. In some embodiments, the shared encoder 162 may include multiple layers, such as an embedding layer 410, and one or more encoder layers 412. In some embodiments, the parameters of the layers 410 and 412 in the shared encoder 162 are frozen to correspond to the pre-trained parameters/model. The shared encoder 162 may take as input a sequence of tokens 402 and may generate an encoded representation for each token. The tokens 402 may be a tokenized representation of the ASR output data determined by the ASR component 150. In some embodiments, the tokens 402 may be text data representing words included in the user input from the user 105. A token 402*a* may correspond to one word or a sub-word. The sequence of tokens 402 may correspond to the sequence of words in the user input.

Each decoder 163/164 may be configured for a particular task. In addition to the attention fusion component 420, the decoder 163/164 may include multiple layers, for example, a feed-forward layer 422 and a softmax/CRF layer 424 depending on the task. In some embodiments, the layer 424 in the IC decoder 163 may be a softmax layer. In some embodiments, the layer 424 in the NER decoder 164 may be a CRF layer followed by a softmax layer.

In some embodiments, the attention fusion component 420 may be implemented outside or separate from the decoder 163/164. In any case, the attention fusion component 420 may connect the shared encoder 162 and the decoder 163/164. As shown in FIG. 4, the attention fusion component 420 may extract useful or relevant features from the intermediate layers of the shared encoder 162. During training, the shared encoder 162 may be frozen, while the attention fusion component 420 and the decoder 163/164 is trained using task-specific training data.

In contrast to a transfer learning approach, where the entire encoder-decoder architecture is fine-tuned with task-specific training data (e.g., training data including labels for domains, intents and/or entities), the approach of the present disclosure freezes the parameters of the shared encoder 162 (which may be a pre-trained model) and utilizes the shared encoder 162 as a shareable encoder for different tasks by training task-specific parameters in the attention fusion component 420 and the decoder layers 422, 424. This type of training may be useful when the speech processing system is expanded to include more domains, as one of the most computation memory-intensive components, the encoder 162, is shared.

The encoded representation of a token 402 is achieved by focusing on different layers of the shared encoder for a given downstream task. The focus on different layers shifts based on the downstream task at hand. To attend on the corresponding token-level representation across different layers for a given downstream task, the task-specific attention-fusion component 420 is configured to learn task-specific token representations, by pooling across different layers at the token level.

In some embodiments, for each task, a task-specific attention query vector, denoted as $Q_t$, is used. This query vector is the task-specific representation, which can be learned during training/fine-tuning. In other embodiments, the attention query vector may be adopted from a decoder 163/164 that has been already trained for the same task but using a different dataset. The representation of token i at layer j is denoted as $V_i^j$ and the attention weight of token i at layer j for task t is denoted as $\alpha_i^j(t)$, which can be calculated as:

$$\alpha_i^j(t) = \frac{\exp(Q^t V_i^j)}{\sum_k \exp(Q^t V_i^k)}$$

$$c_i(t) = \sum_{j=1} \alpha_i^j V_i^j$$

The contextual representation of token i for task t, denoted as $c_i(t)$, can be calculated as a weighted sum of token i across all vertical layers.

Using the attention fusion component 420 can also improve knowledge transfer across different natural languages (e.g., English, Spanish, German, etc.). In some embodiments, the shared encoder 162 may be used to process user inputs provided in different languages. The encoded representation data outputted by the shared encoder 162 may be used by decoders 163/164 configured to process user inputs in different languages. For example, a first user input may correspond to English, the shared encoder 162 may determine first encoded representation data corresponding to the first user input, and a first decoder 163*a* may process the first encoded representation data, where the first decoder 163*a* may correspond to English. As further example, a second user input may correspond to Spanish, the shared encoder 162 may determine second encoded representation data corresponding to the second user input, and a second decoder 163*b* may process the second encoded representation data, where the second decoder 163*b* may correspond to Spanish.

Use of the shared encoder 162, the attention fusion component 420, and the decoder 163/164 results in decreased training time, as the shared encoder 162 is frozen, and also results in increased accuracy during runtime, as the attention fusion component 420 extracts task-specific token representations for different tasks. The attention fusion component 420 is configured to be task-specific based on how it is trained using task-specific training data.

Figure 5A:
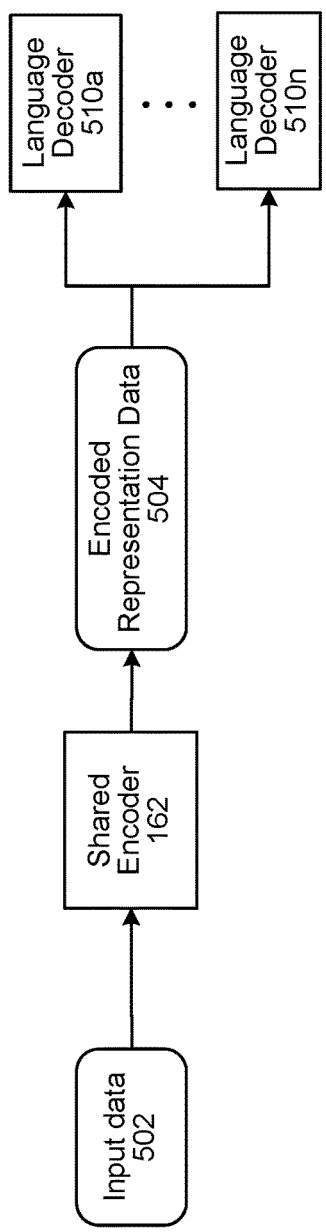
FIGS. 5A-5B are conceptual diagrams illustrating example arrangements of a shared encoder and decoders, according to embodiments of the present disclosure.

FIG. 5A is a conceptual diagram illustrating an example arrangement of the shared encoder 162 and decoders. As shown, in some embodiments, the system 100 may include multiple language decoders 510 configured to process inputs corresponding to a particular natural language. The shared encoder 162 may process input data 502. The input data 502 may be ASR output data corresponding to a user input. The shared encoder 162 may determine encoded representation data 504, which may be processed by one or more language decoders 510. The language decoder 510*a* may correspond to a first natural language (e.g., English), a language decoder 510*b* may correspond to a second natural language (e.g., Spanish), the language decoder 510*n* may correspond to a nth natural language, and so on.

Figure 5B:
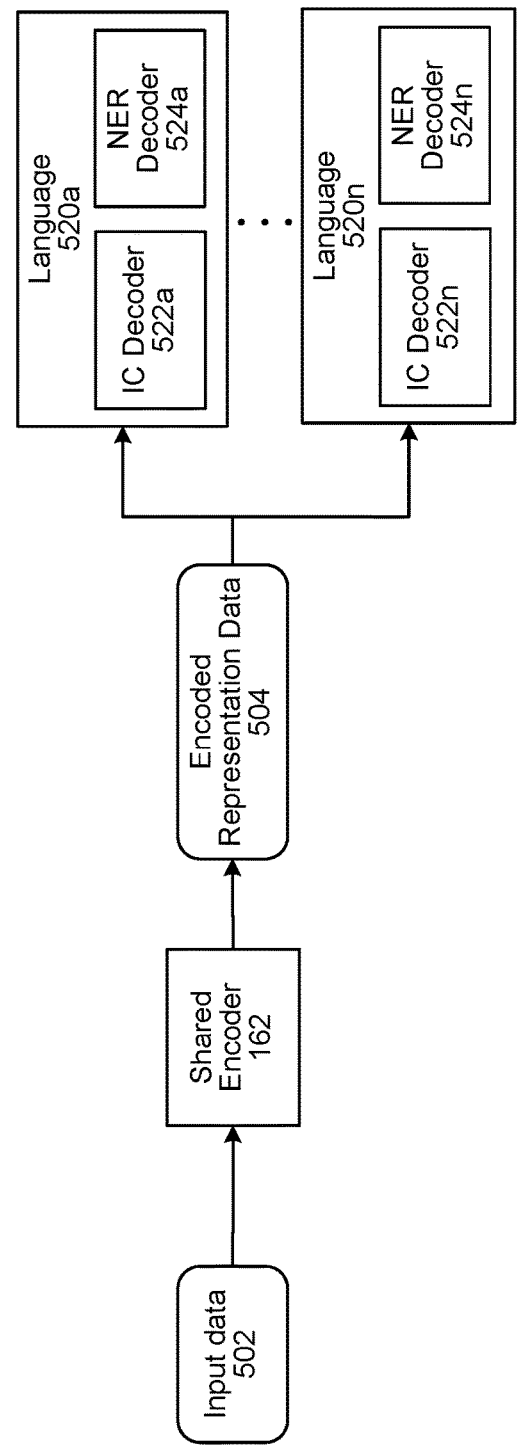

FIG. 5B is a conceptual diagram illustrating another example arrangement of the shared encoder 162 and decoders. As shown, in some embodiments, the system 100 may include multiple IC decoders 522 and NER decoders 524 configured process user inputs of a particular language 520. The IC decoders 522 and the NER decoders 524 may process the encoded representation data 504 determined by the shared encoder 162. The IC decoder 522*a* and the NER decoder 524*a* may correspond to the first language 520*a* (e.g., English), a IC decoder 522*b* and a NER decoder 524*b* may correspond to a second language 520*b*, the IC decoder 522*n* and the NER decoder 524*n* may correspond to a nth language 520*n*, and so on.

Figure 6:
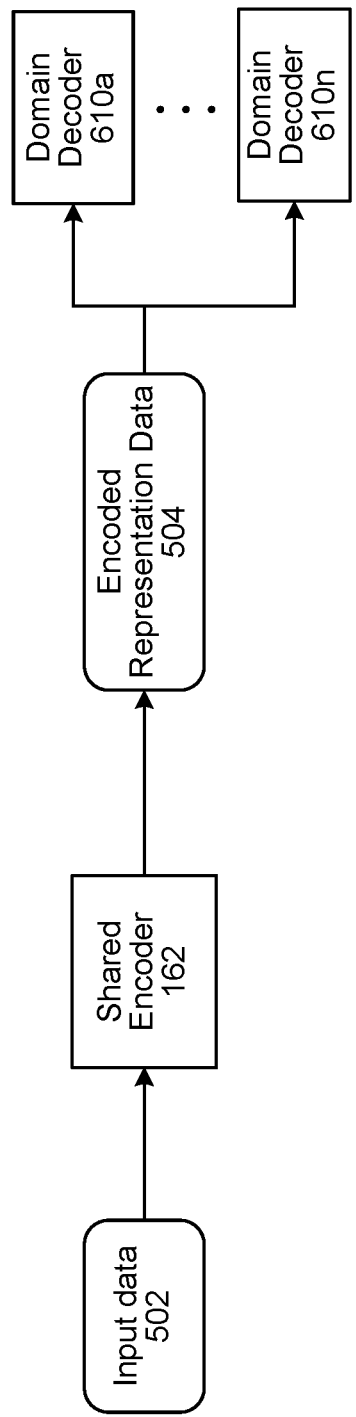
FIG. 6 is a conceptual diagram illustrating an example arrangement of a shared encoder and decoders, according to embodiments of the present disclosure.

FIG. 6 is a conceptual diagram illustrating another example arrangement of the shared encoder 162 and decoders. As shown, in some embodiments, the system 100 may include multiple domain decoders 610, which may process the encoded representation data 504 outputted by the shared encoder 162. The domain decoder 610*a* may correspond to a first domain (e.g., a shopping domain), a domain decoder 610*b* may correspond to a second domain (e.g., a music domain), a domain decoder 610*n* may correspond to a nth domain, and so on. The domain decoders 610 may be configured to perform domain classification as described herein (for example, with respect to the domain recognizers 263). Based on performing domain classification, the system 100 may determine a domain (e.g., a first domain) corresponding to the user input. After performing domain classification, the system 100 may process the encoded representation data 504 using one or more IC decoders 163 and one or more NER decoders 164 corresponding to the first domain corresponding to the user input. In this manner, the output of the shared encoder 162 is used for multiple tasks and by multiple decoders—the domain decoders 610, the IC decoders 163 and the NER decoders 164. This results in computation and time savings since a separate encoder is not run for each of the different tasks to be performed for NLU processing.

In some embodiments, the output of the shared encoder 162 may be used by other components of the system 120. The output of the shared encoder 162 may be used by the skill component 190 as a representation of the spoken input to determine, for example, output data responsive to the spoken input. The output of the shared encoder 162 may be used by the TTS component 180 as a representation of the spoken input to determine, for example, how (e.g., use words included in the spoken input, use a sentence structure similar to the spoken input, etc.) synthesized speech may be presented.

Figure 7:
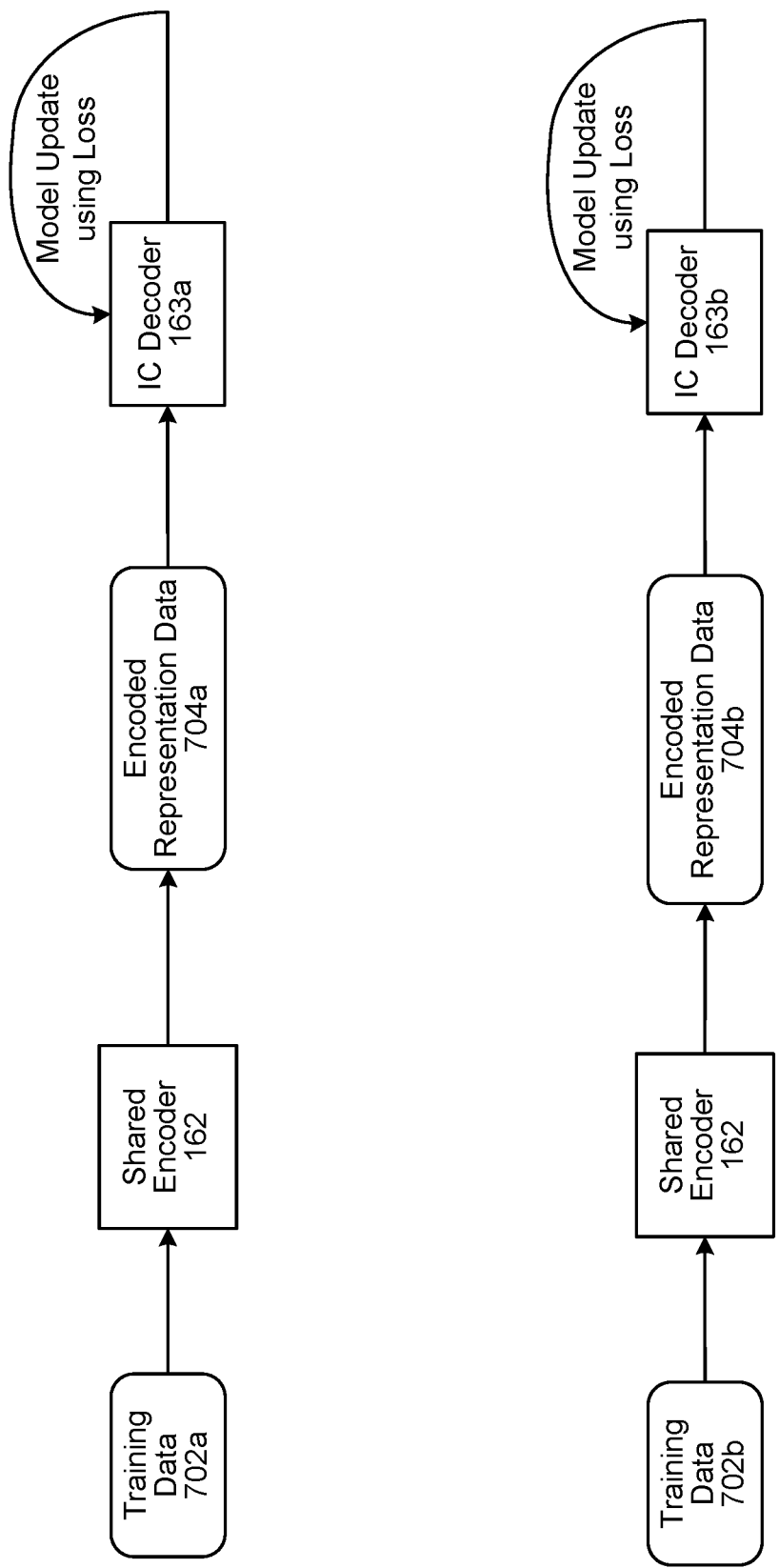
FIG. 7 is a conceptual diagram illustrating how a shared encoder and decoders may be trained, according to embodiments of the present disclosure.

FIG. 7 is a conceptual diagram illustrating how the shared encoder 162 and decoders may be trained. In some embodiments, the shared encoder 162 may be a pre-trained language model, such as, a BERT model. The shared encoder 162 may be trained using various words corresponding to multiple different natural languages, and may be trained to generate an encoded representation of a natural language input.

In some embodiments, the IC decoder 163*a* may correspond to a first domain, and may be trained using training data 702*a*. The training data 702*a* may be text data or token data representing user inputs corresponding to the first domain. In some embodiments, the training data 702*a* may be labeled to indicate an intent corresponding to each user input. The training data 702*a* may be processed using the shared encoder 162 to determine encoded representation data 704*a*. This may be referred to as one epoch. The encoded representation data 704*a* may be processed by the IC decoder 163*a* for multiple epochs for training purposes. After an epoch, the IC decoder 163*a* may update the parameters and weights based on a loss computed during that epoch, and may then process the encoded representation data 704*a* using the updated decoder with updated parameters and weights. Training of the IC decoder 163*a* may also involve training of an attention fusion component 420*a* (shown in FIG. 4) corresponding to the IC decoder 163*a*. The attention fusion component 420*a* may be trained to extract features from the encoded representation data 704*a* that are useful for the IC decoder 163*a* to perform IC processing.

Similarly, another decoder—the IC decoder 163*b* may be trained using training data 702*b*. The IC decoder 163*b* may correspond to a second domain. The training data 702*b* may be text data or token data representing user inputs corresponding to the second domain. In some embodiments, the training data 702*b* may be labeled to indicate an intent corresponding to each user input. The training data 702*b* may be processed using the shared encoder 162 to determine encoded representation data 704*b*. This may be referred to as one epoch. The encoded representation data 704*b* may be processed by the IC decoder 163*b* for multiple epochs for training purposes. After an epoch, the IC decoder 163*b* may update the parameters and weights based on a loss computed during that epoch, and may then process the encoded representation data 704*b* using the updated decoder with updated parameters and weights. Training of the IC decoder 163*b* may also involve training of an attention fusion component 420*b* corresponding to the IC decoder 163*b*. The attention fusion component 420*b* may be trained to extract features from the encoded representation data 704*b* that is useful for the IC decoder 163*b* to perform IC processing.

In some embodiments, the IC decoder 163*a* and the IC decoder 163*b* may use the same attention fusion component 420, as they are both trained for the same task—intent classification.

Other decoders, such as the NER decoders 164, may be trained in a similar manner. In some embodiments, the training data 702*a* may include labels indicating entities and/or entity types corresponding to each user input, and the encoded representation data 704*a* can also be used to train the NER decoder 164*a* corresponding to the first domain. Training of the NER decoder 164*a* may involve training of an attention fusion component 420*c*, which may be trained to extract features from the encoded representation data 704*a* that are useful for the NER decoder 164*a* to perform NER processing. The attention fusion component 420*c* may be different than the attention fusion component 420*a* used by the IC decoder 163*a*, since they are trained for different tasks.

Figure 8:
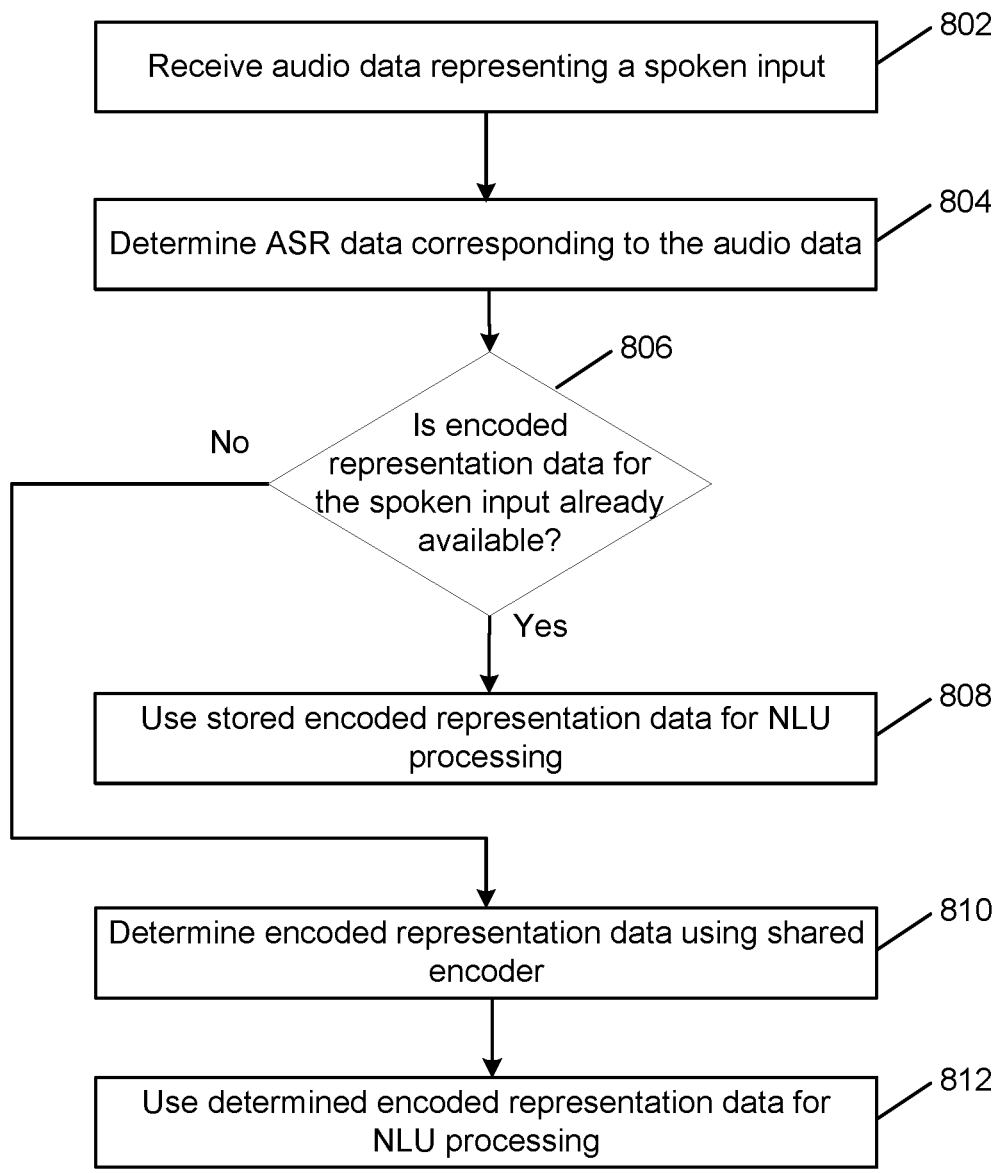
FIG. 8 is a flowchart of an example process that may be performed by a system for processing a spoken input, according to embodiments of the present disclosure.

FIG. 8 is a flowchart of an example process that may be performed by the system 120 for processing a spoken input. In this example process, the system 120 may use stored encoded representation data, when available, for a user input. The system 120 may receive (802) audio data representing a spoken input from, for example, the user 105. The ASR component 150 may determine (804) ASR data corresponding to the audio data. At a decision step 806, the system 120 may determine whether encoded representation data for the spoken input is already available. The system 120 may include a data storage that may store multiple encoded representation data, each corresponding to a particular user input. For example, the data storage may store encoded representation data for user inputs that are frequently received by the system 120. In some embodiments, the encoded representation data may be stored in the profile storage 170, and may correspond to user inputs frequently received from the user 105 associated with the profile storage 170. In other embodiments, the frequently received user inputs may be received from multiple different users. The data storage may be a hash table, where the key may be text data or token data representing the user input, and the value may be the encoded representation data corresponding to the user input. Using the ASR data corresponding to the audio data received in step 802, the system 120 may perform a hash lookup to determine whether encoded representation data for the particular spoken input is stored in the data storage.

If encoded representation data for the spoken input is available, then the NLU component 160 may use (808) the stored encoded representation data for NLU processing. If encoded representation data for the spoken input is not available, then the NLU component 160 may determine (810) encoded representation data, corresponding to the spoken input, using the shared encoder 162. The NLU component 160 may then use (812) the determined encoded representation data for NLU processing. In this manner, computation and time savings are realized during runtime processing due, at least in part, to use of stored encoded representation data.

In some embodiments, the encoded representation data determined in step 810 may be stored, and may be used when the same spoken input is received. In some embodiments, the system 120 may maintain a first data storage to store encoded representation data for frequently received spoken inputs, where each instance of the encoded representation data may be associated with the respective ASR data representing the spoken input. In such embodiments, the system 120 may maintain a separate/second data storage to store encoded representation data that may be determined in step 810 when processing spoken inputs received by the system 120. In such embodiments, the system 120 may determine whether a spoken input is a frequently received spoken input, and if the spoken input is a frequently received spoken input, then the first data storage may be searched (per step 806) for the encoded representation data corresponding to the spoken input. If the spoken input is not a frequently received spoken input, then the second data storage may be searched (per step 806) for the encoded representation data corresponding to the spoken input.

The system 120 may operate using various components as illustrated in FIG. 1 to process user inputs received from the user 105. The various components may be located on a same or different physical devices. Communication between various components may occur directly or across a network(s) 199.

A microphone or array of microphones (of or otherwise associated with the device 110) may capture audio 107 from the user 105. The device 110 processes audio data representing the audio 107, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using the wakeword detection component 920 (shown in FIG. 9). The wakeword detection component 920 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 920 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 920 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used. In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example, the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword detection component 920 detects a wakeword, the device 110 may "wake" and begin transmitting audio data, representing the audio 107, to the system 120 or to other components included in the device 110. The audio data may include the detected wakeword, or the device 110 may remove the portion of the audio data, corresponding to the detected wakeword, prior to sending the audio data to the system 120/other components of the device 110.

Figure 9:
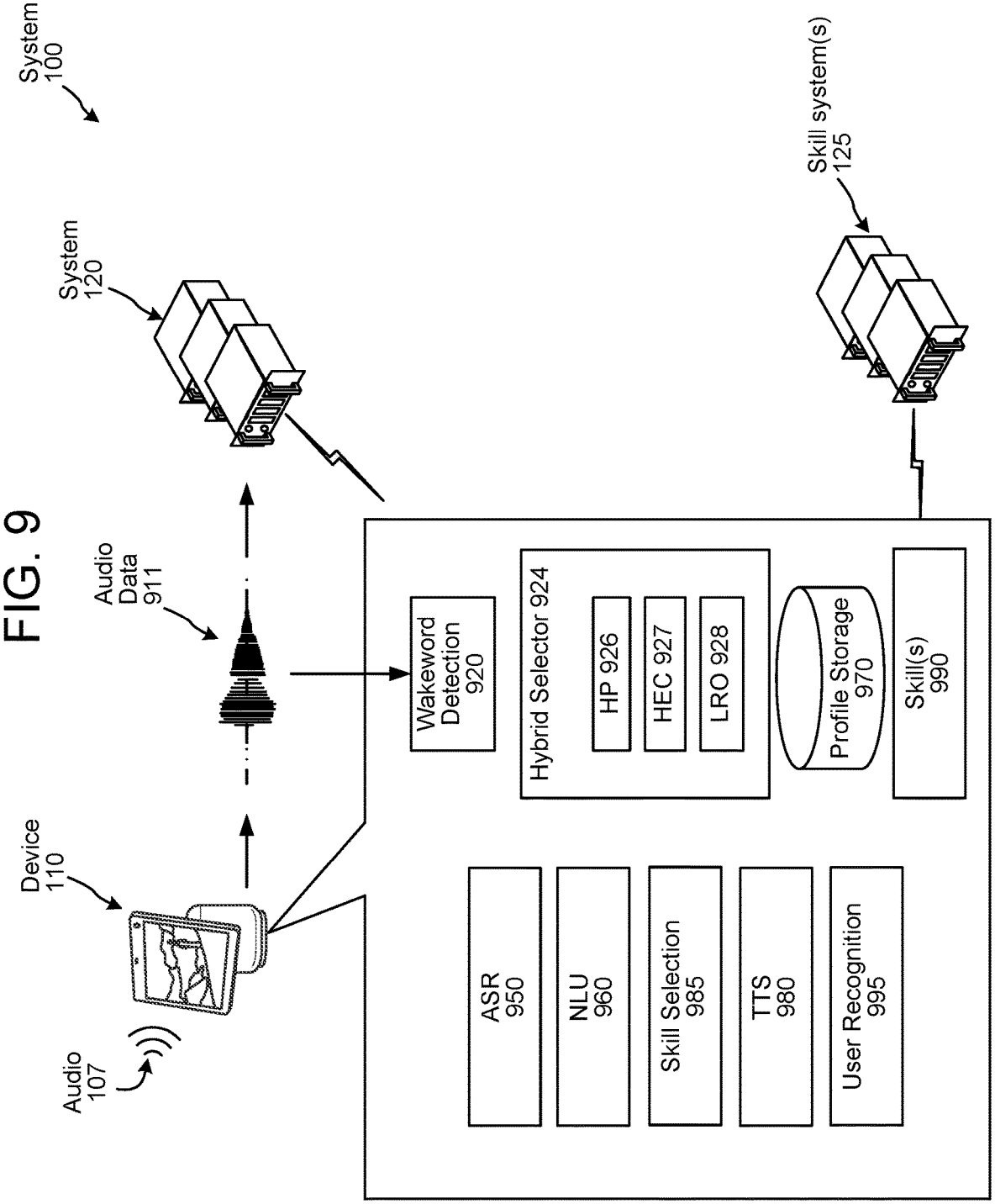
FIG. 9 is a conceptual diagram illustrating components that may be included in a device, according to embodiments of the present disclosure.

The foregoing describes illustrative components and processing of the system 120. The following describes illustrative components and processing of the device 110. As illustrated in FIG. 9, in at least some embodiments the system 120 may receive audio data 911 from the device 110, to recognize speech corresponding to a spoken natural language in the received audio data 911, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 920 configured to detect a wakeword (e.g., "Alexa") that indicates to the device 110 that the audio data 911 is to be processed for determining NLU output data. In at least some embodiments, a hybrid selector 924, of the device 110, may send the audio data 911 to the wakeword detection component 920. If the wakeword detection component 920 detects a wakeword in the audio data 911, the wakeword detection component 920 may send an indication of such detection to the hybrid selector 924. In response to receiving the indication, the hybrid selector 924 may send the audio data 911 to the system 120 and/or an on-device ASR component 950. The wakeword detection component 920 may also send an indication, to the hybrid selector 924, representing a wakeword was not detected. In response to receiving such an indication, the hybrid selector 924 may refrain from sending the audio data 911 to the system 120, and may prevent the on-device ASR component 950 from processing the audio data 911. In this situation, the audio data 911 can be discarded.

The device 110 may conduct its own speech processing using on-device language processing components (an on-device ASR component 950, and/or an on-device NLU component 960) similar to the manner discussed above with respect to the speech processing system-implemented ASR component 150, and NLU component 160. The device 110 may also internally include, or otherwise have access to, other components such as a skill selection component 985 (configured to process in a similar manner to the skill selection component 185), one or more skills 990 (configured to process in a similar manner to the skill component(s) 190), a user recognition component 995 (configured to process in a similar manner to the user recognition component 195), profile storage 970 (configured to store similar profile data to the profile storage 170), a TTS component 980 (configured to process in a similar manner as the TTS component 180), and other components. In at least some embodiments, the on-device profile storage 970 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 924, of the device 110, may include a hybrid proxy (HP) 926 configured to proxy traffic to/from the system 120. For example, the HP 926 may be configured to send messages to/from a hybrid execution controller (HEC) 927 of the hybrid selector 924. For example, command/directive data received from the system 120 can be sent to the HEC 927 using the HP 926. The HP 926 may also be configured to allow the audio data 911 to pass to the system 120 while also receiving (e.g., intercepting) this audio data 911 and sending the audio data 911 to the HEC 927.

In at least some embodiments, the hybrid selector 924 may further include a local request orchestrator (LRO) 928 configured to notify the on-device ASR component 950 about the availability of the audio data 911, and to otherwise initiate the operations of on-device language processing when the audio data 911 becomes available. In general, the hybrid selector 924 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 911 is received, the HP 926 may allow the audio data 911 to pass through to the system 120 and the HP 926 may also input the audio data 911 to the on-device ASR component 950 by routing the audio data 911 through the HEC 927 of the hybrid selector 924, whereby the LRO 928 notifies the on-device ASR component 950 of the audio data 911. At this point, the hybrid selector 924 may wait for response data from either or both the system 120 and/or the on-device language processing components. However, the disclosure is not limited thereto, and in some examples the hybrid selector 924 may send the audio data 911 only to the on-device ASR component 950 without departing from the disclosure. For example, the device 110 may process the audio data 911 on-device without sending the audio data 911 to the system 120.

The on-device ASR component 950 is configured to receive the audio data 911 from the hybrid selector 924, and to recognize speech in the audio data 911, and the on-device NLU component 9 60 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 960) may be selected as usable to respond to a natural language input, and local response data may be sent (e.g., local NLU output data, local knowledge base information, internet search results, and/or local directive data) to the hybrid selector 924, such as a "ReadyToExecute" response. The hybrid selector 924 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 911 to the system 120, and the response data from the system 120 may include the unique identifier to identify to which natural language input the response data corresponds.

In at least some embodiments, the device 110 may include one or more skill components 990. The skill component(s) 990 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 10:
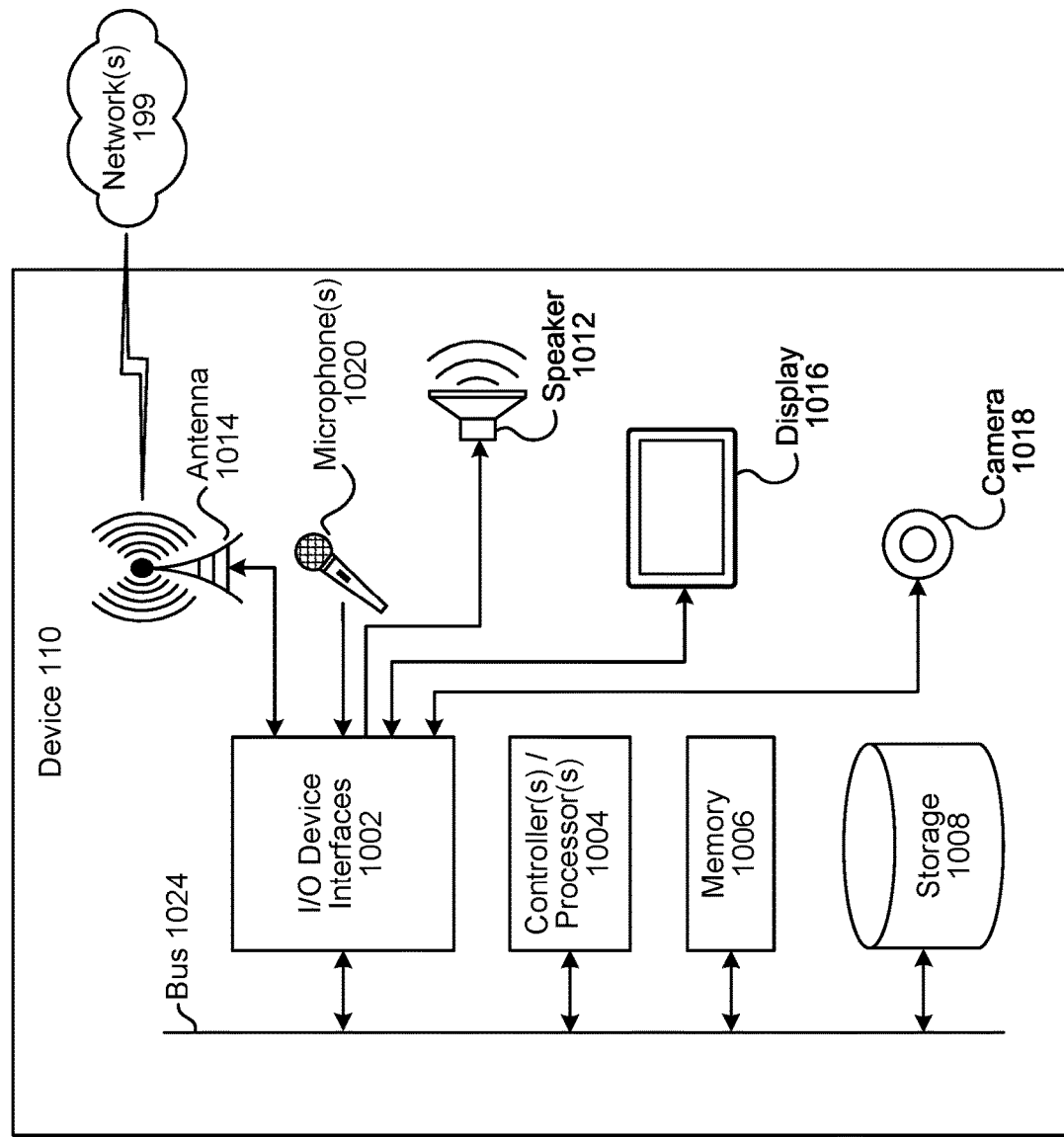
FIG. 10 is a block diagram conceptually illustrating example components of a device, according to embodiments of the present disclosure.
Figure 11:
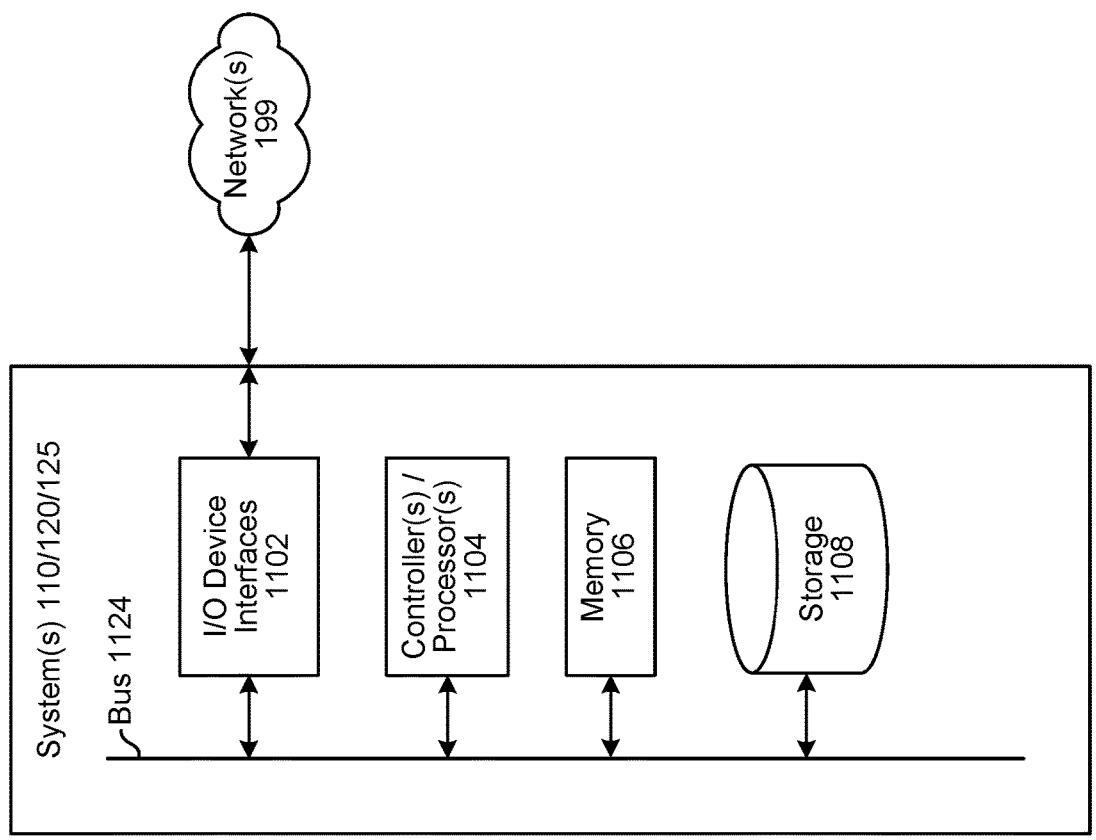
FIG. 11 is a block diagram conceptually illustrating example components of a system, according to embodiments of the present disclosure.

FIG. 10 is a block diagram conceptually illustrating a device 110 of the system 100. FIG. 11 is a block diagram conceptually illustrating example components of a remote device, such as the system 120 and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device 110, the system 120, and/or skill 125 may include their own dedicated processors, memory, and/or storage. Alternatively, one or more of the components of the device 110, the system 120, and/or skill 125 may utilize the I/O interfaces (1002/1102), processor(s) (1004/1104), memory (1006/1106), and/or storage (1008/1108) of the device 110, the system 120, and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120, and the skill 125, as described herein, are illustrative, and may be located as a stand-alone device or may be included, in whole or in part, as a component of a larger device or system.

Figure 12:
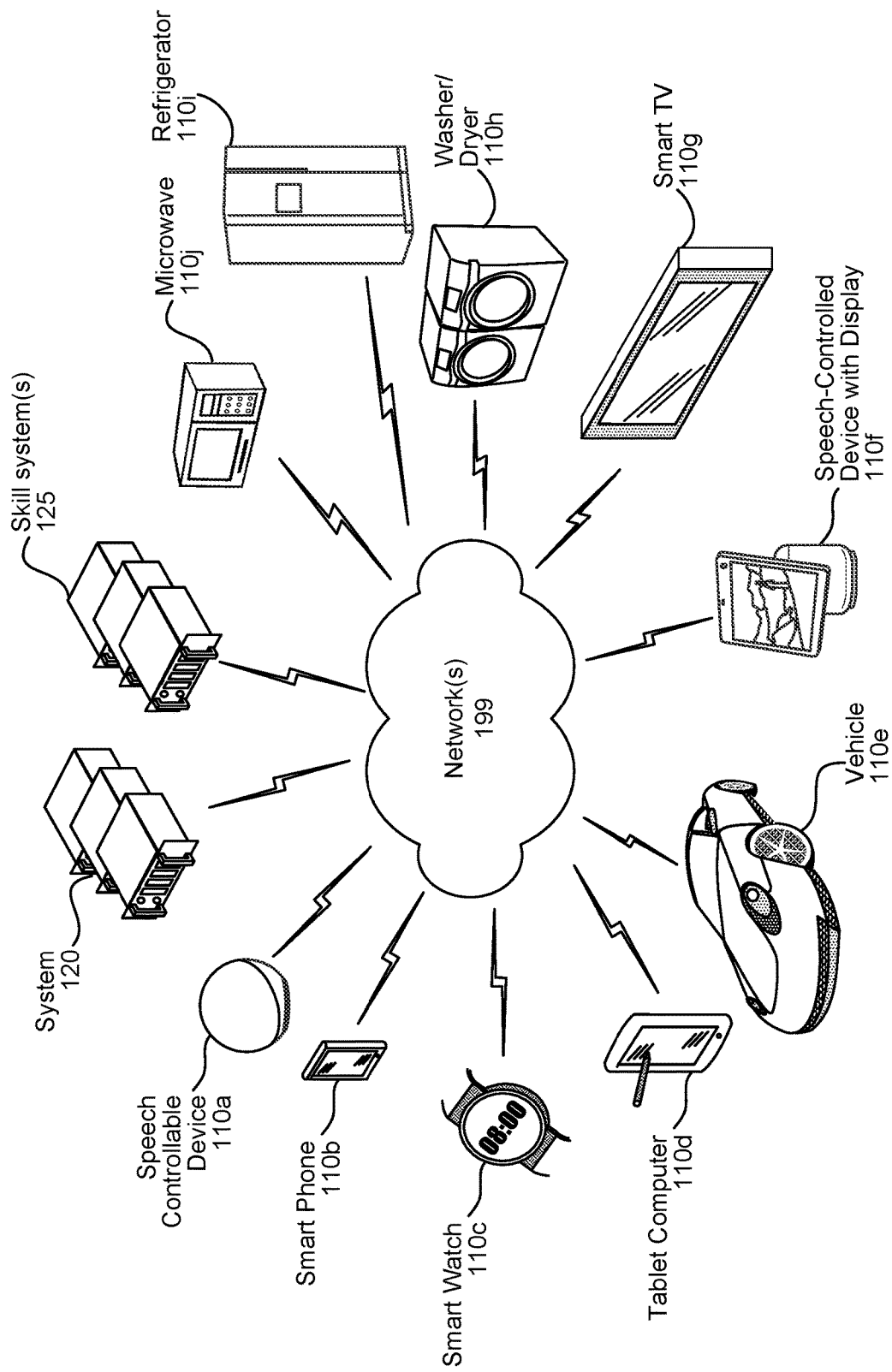
FIG. 12 illustrates an example of a computer network for use with the overall system, according to embodiments of the present disclosure.

As illustrated in FIG. 12, multiple devices (110*a*-110*j*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110*a*, a smart phone 110*b*, a smart watch 110*c*, a tablet computer 110*d*, a vehicle 110*e*, a speech-controllable display device 110*f*, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first audio data representing a first spoken input;
determining first automatic speech recognition (ASR) data corresponding to the first audio data;
determining, using an encoder and the first ASR data, first encoded representation data, the encoder comprising a plurality of sequential layers connected in series, the plurality of sequential layers including at least a first layer and a second layer different from the first layer, the first encoded representation data including a first encoded value output by the first layer and a second encoded value output by the second layer;
processing, using a first attention component, the first encoded representation data to determine the first encoded value is relevant for performing intent classification processing;
processing, using a first decoder configured to perform intent classification processing for a first domain, the first encoded value to determine a first intent corresponding to the first spoken input;
processing, using a second attention component, the first encoded representation data to determine the second encoded value is relevant for performing named entity recognition processing;
processing, using a second decoder configured to perform entity recognition for the first domain, the second encoded value to determine a first entity represented in the first spoken input; and
determining, based at least in part on the first intent and the first entity, first output data responsive to the first spoken input.

2. The computer-implemented method of claim 1, further comprising:
receiving second audio data representing a second spoken input;
determining second ASR data corresponding to the second audio data;
identifying, from a data storage and using the second ASR data, second encoded representation data corresponding to the second ASR data, the second encoded representation data generated using the encoder;
processing, using the first attention component, the second encoded representation data to determine first data relevant for intent classification processing;
processing, using the first decoder, the first data to determine a second intent corresponding to the second spoken input;
processing, using the second attention component, the second encoded representation data to determine second data relevant for named entity recognition processing;
processing, using the second decoder, the second data to determine a second entity represented in the second spoken input; and
determining, based at least in part on the second intent and the second entity, second output data responsive to the second spoken input.

3. The computer-implemented method of claim 1, further comprising:
processing, using a third attention component configured to determine data relevant for performing intent classification processing for a second domain different from the first domain, the first encoded representation data to determine first data;
processing, using a third decoder configured to perform intent classification processing for the second domain, the first data to determine a second intent corresponding to the first spoken input;
processing, using a fourth attention component configured to determine data relevant for performing named entity recognition processing for the second domain, the first encoded representation data to determine second data;
processing, using a fourth decoder configured to perform named entity recognition processing for the second domain, the second data to determine a second entity represented in the first spoken input; and determining the first output data further based at least in part on the second intent and the second entity.

4. The computer-implemented method of claim 1, wherein the first attention component, the first decoder, the second attention component and the second decoder correspond to a first language, and the method further comprises:
processing, using a third attention component corresponding to a second language different from the first language, the first encoded representation data to determine first data;
processing, using a third decoder corresponding to the second language, the first data to determine a second intent corresponding to the first spoken input;
processing, using a fourth attention component corresponding to the second language, the first encoded representation data to determine second data;
processing, using a fourth decoder corresponding to the second language, the second data to determine a second entity represented in the first spoken input; and
determining the first output data further based at least in part on the second intent and the second entity.

5. A computer-implemented method comprising:
receiving first input data representing a first natural language input;
determining, using an encoder and the first input data, first encoded representation data, the encoder comprising a plurality of sequential layers connected in series, the plurality of sequential layers including at least a first layer and a second layer different from the first layer, the first encoded representation data including a first value output by the first layer and a second value output by the second layer;
processing, using a first attention component associated with a first decoder, the first encoded representation data to determine the first value;
processing, using the first decoder, the first value to determine first natural language understanding (NLU) data corresponding to the first natural language input;
processing, using a second attention component associated with a second decoder, the first encoded representation data to determine the second value;
processing, using the second decoder, the second value to determine second NLU data corresponding to the first natural language input; and
determining, based at least in part on the first NLU data and the second NLU data, first output data responsive to the first natural language input.

6. The computer-implemented method of claim 5, further comprising:
processing the first encoded representation data using the first attention component to determine the first value is relevant for the first decoder to determine the first NLU data; and
processing the first encoded representation data using the second attention component to determine the second value is relevant for the second decoder to determine the second NLU data.

7. The computer-implemented method of claim 5, wherein the first decoder and second decoder correspond to a first domain, and the method further comprises:
processing, using a third decoder corresponding to a second domain different than the first domain, the first encoded representation data to determine third NLU data corresponding to the first natural language input; and
determining, further based at least in part on the third NLU data, the first output data responsive to the first natural language input.

8. The computer-implemented method of claim 5, wherein the first decoder and second decoder correspond to a first natural language, and the method further comprises:
processing, using a third decoder corresponding to a second natural language different than the first natural language, the first encoded representation data to determine third NLU data corresponding to the first natural language input; and
determining, further based at least in part on the third NLU data, the first output data responsive to the first natural language input.

9. The computer-implemented method of claim 5, further comprising:
receiving second input data representing a second natural language input;
identifying, from a data storage and using the second input data, second encoded representation data corresponding to the second input data;
processing, using the first decoder, the second encoded representation data to determine third NLU data corresponding to the second natural language input;
processing, using the second decoder, the second encoded representation data to determine fourth NLU data corresponding to the second natural language input; and
determining, based at least in part on the third NLU data and the fourth NLU data, second output data responsive to the second natural language input.

10. The computer-implemented method of claim 5, further comprising:
receiving second input data representing a second natural language input;
determining, using the encoder and the second input data, second encoded representation data;
processing, using a third decoder, the second encoded representation data to determine a first intent corresponding to the second natural language input, the third decoder configured to perform intent classification for a first domain;
processing, using a fourth decoder, the second encoded representation data to determine a first entity corresponding to the second natural language input, the fourth decoder configured to perform named entity recognition for the first domain; and
determining, based at least in part on the first intent and the first entity, second output data responsive to the second natural language input.

11. The computer-implemented method of claim 5, further comprising:
receiving training data corresponding to a plurality of natural language inputs;
processing, using the encoder, the training data to determine training encoded data;
processing, using the first decoder and for a first training epoch, the training encoded data to determine first loss data;
determining a first updated decoder based at least in part on the first loss data and the first decoder;
processing, using the first updated decoder and for a second training epoch, the training encoded data to determine second loss data;
determining a second updated decoder based at least in part on the second loss data and the first updated decoder; and using the second updated decoder for processing subsequently received natural language inputs.

12. The computer-implemented method of claim 5, further comprising:
sending, to a skill component, the first NLU data and the second NLU data;
sending, to the skill component, the first encoded representation data; and
receiving, from the skill component, the first output data determined based at least in part on the first NLU data, the second NLU data, and the first encoded representation data.

13. A system comprising:
at least one processor; and
at least one memory including instructions that, when executed by the at least one processor, cause the system to:
receive first input data representing a first natural language input;
determine, using an encoder and the first input data, first encoded representation data, the encoder comprising a plurality of sequential layers connected in series, the plurality of sequential layers including at least a first layer and a second layer different from the first layer, the first encoded representation data including a first value output by the first layer and a second value output by the second layer;
process, using a first attention component associated with a first decoder, the first encoded representation data to determine the first value;
process, using the first decoder, the first value to determine first natural language understanding (NLU) data corresponding to the first natural language input;
process, using a second attention component associated with a second decoder, the first encoded representation data to determine the second value;
process, using the second decoder, the second value to determine second NLU data corresponding to the first natural language input; and
determine, based at least in part on the first NLU data and the second NLU data, first output data responsive to the first natural language input.

14. The system of claim 13, wherein the at least one memory includes further instructions that, when executed by the at least one processor, further cause the system to:
process the first encoded representation data using the first attention component to determine the first value is relevant for the first decoder to determine the first NLU data; and
process the first encoded representation data using the second attention component to determine the second value is relevant for the second decoder to determine the second NLU data.

15. The system of claim 13, wherein the first decoder and second decoder correspond to a first domain, and wherein the at least one memory includes further instructions that, when executed by the at least one processor, further cause the system to:
process, using a third decoder corresponding to a second domain different than the first domain, the first encoded representation data to determine third NLU data corresponding to the first natural language input; and
determine, further based at least in part on the third NLU data, the first output data responsive to the first natural language input.

16. The system of claim 13, wherein the first decoder and second decoder correspond to a first natural language, and wherein the at least one memory includes further instructions that, when executed by the at least one processor, further cause the system to:
process, using a third decoder corresponding to a second natural language different than the first natural language, the first encoded representation data to determine third NLU data corresponding to the first natural language input; and
determine, further based at least in part on the third NLU data, the first output data responsive to the first natural language input.

17. The system of claim 13, wherein the at least one memory includes further instructions that, when executed by the at least one processor, further cause the system to:
receive second input data representing a second natural language input;
identify, from a data storage and using the second input data, second encoded representation data corresponding to the second input data;
process, using the first decoder, the second encoded representation data to determine third NLU data corresponding to the second natural language input;
process, using the second decoder, the second encoded representation data to determine fourth NLU data corresponding to the second natural language input; and
determine, based at least in part on the third NLU data and the fourth NLU data, second output data responsive to the second natural language input.

18. The system of claim 13, wherein the at least one memory includes further instructions that, when executed by the at least one processor, further cause the system to:
receive second input data representing a second natural language input;
determine, using the encoder and the second input data, second encoded representation data;
process, using a third decoder, the second encoded representation data to determine a first intent corresponding to the second natural language input, the third decoder configured to perform intent classification for a first domain;
process, using a fourth decoder, the second encoded representation data to determine a first entity corresponding to the second natural language input, the fourth decoder configured to perform named entity recognition for the first domain; and
determine, based at least in part on the first intent and the first entity, second output data responsive to the second natural language input.

19. The system of claim 13, wherein the at least one memory includes further instructions that, when executed by the at least one processor, further cause the system to:
receive training data corresponding to a plurality of natural language inputs;
process, using the encoder, the training data to determine training encoded data;
process, using the first decoder and for a first training epoch, the training encoded data to determine first loss data;
determine a first updated decoder based at least in part on the first loss data and the first decoder;
process, using the first updated decoder and for a second training epoch, the training encoded data to determine second loss data;

determine a second updated decoder based at least in part on the second loss data and the first updated decoder; and use the second updated decoder for processing subsequently received natural language inputs.

20. The system of claim 13, wherein the at least one memory includes further instructions that, when executed by the at least one processor, further cause the system to:

send, to a skill component, the first NLU data and the second NLU data;

send, to the skill component, the first encoded representation data; and receive, from the skill component, the first output data determined based at least in part on the first NLU data, the second NLU data, and the first encoded representation data.

* * * * *